(12) United States Patent
Nawaz

(10) Patent No.: US 12,506,443 B2
(45) Date of Patent: Dec. 23, 2025

(54) DEMODULATOR CIRCUITS FOR AMPLITUDE SHIFT KEYING (ASK) COMMUNICATION DEMODULATION

(71) Applicant: Molex, LLC, Lisle, IL (US)

(72) Inventor: Bazil Nawaz, Warrenville, IL (US)

(73) Assignee: Molex, LLC

( * ) Notice: Subject to any disclaimer, the term of this patent is extended or adjusted under 35 U.S.C. 154(b) by 197 days.

(21) Appl. No.: 18/212,210

(22) Filed: Jun. 21, 2023

(65) Prior Publication Data

US 2024/0014779 A1   Jan. 11, 2024

Related U.S. Application Data

(60) Provisional application No. 63/358,875, filed on Jul. 7, 2022.

(51) Int. Cl.
*H03D 1/00* (2006.01)
*H02J 50/10* (2016.01)

(52) U.S. Cl.
CPC .............. *H03D 1/00* (2013.01); *H02J 50/10* (2016.02)

(58) Field of Classification Search
CPC .. H03D 1/00; H02J 50/10; H04B 5/79; H04L 27/06
See application file for complete search history.

(56) References Cited

U.S. PATENT DOCUMENTS

| | | |
|---|---|---|
| 2012/0027129 A1 | 2/2012 | Zhao et al. |
| 2012/0134444 A1 | 5/2012 | Tsukamoto |
| 2015/0115735 A1 | 4/2015 | Singh et al. |
| 2020/0381946 A1* | 12/2020 | Bhandarkar ........ H02M 3/1582 |

FOREIGN PATENT DOCUMENTS

JP       2009094739 A       4/2009

* cited by examiner

*Primary Examiner* — Jeffrey M Shin
(74) *Attorney, Agent, or Firm* — Perilla Knox & Hildebrandt LLP; Usha Munukutla-Parker

(57) ABSTRACT

Exemplary embodiments are disclosed of demodulator circuits for amplitude shift keying (ASK) communication demodulation. In an exemplary embodiment, a demodulator circuit is configurable (e.g., modular and/or scalable, etc.) to include any number of levels (one or more N-Levels) of demodulation. Each level of the demodulator circuit includes a peak detector, a bandpass filter, and a lowpass filter and control capacitor(s). The bandpass filter is coupled with and between the peak detector and the lowpass filter and control capacitor(s). Each level of the demodulator circuit may be identical to each other and include the same or similar components (e.g., peak detector, bandpass filter, lowpass filter and control capacitor(s)). And each demodulator circuit level (Level-1, Level-2 . . . Level-N) may be coupled with a summing voltage amplifier. The summing voltage amplifier may be coupled with an adaptive DC-offset and a lowpass filter, which, in turn, is coupled with a microcontroller.

22 Claims, 22 Drawing Sheets

DEMODULATOR CIRCUITS FOR AMPLITUDE SHIFT KEYING (ASK) COMMUNICATION DEMODULATION

CROSS-REFERENCE TO RELATED APPLICATION

This application claims priority to and the benefit of U.S. Provisional Patent Application No. 63/358,875 filed Jul. 7, 2022. The entire disclosure of this provisional patent application is incorporated herein by reference.

TECHNICAL FIELD

This disclosure generally relates to demodulator circuits for amplitude key shifting (ASK) communication demodulation.

DESCRIPTION OF RELATED ART

Inductive power transfer and wireless charging has seen significant growth in consumer electronics, automotive vehicles, industrial devices, biomedical implants, and home appliances over the past decade. But designing a complete inductive power transfer system (IPTS) is challenging due to various constraints possible (e.g., cost, efficiency, size, weight, safety, temperature, etc.).

A general inductive power transfer system includes a power source, inverter, resonant tank, rectifier, and load. The inductive power transfer system may also include a demodulator for wireless power ASK modulated signals. Generally, a demodulator is an electronic circuit or a computer program in a software-defined radio (SDR) that is used to recover information content from a modulated carrier wave.

SUMMARY

This section provides a general summary of the disclosure and is not a comprehensive disclosure of its full scope or all of its features.

Exemplary embodiments are disclosed of demodulator circuits for amplitude shift keying (ASK) communication demodulation. In an exemplary embodiment, a demodulator circuit is configurable to include any number of levels (one or more N-Levels) of demodulation. Each level of the demodulator circuit includes a peak detector, a bandpass filter, and a lowpass filter and control capacitor(s). The bandpass filter is coupled with and between the peak detector and the lowpass filter and control capacitor(s). Each level of the demodulator circuit may be identical to each other and include the same or similar components (e.g., peak detector, bandpass filter, lowpass filter and control capacitor(s)). And each demodulator circuit level (Level-1, Level-2 . . . Level-N) may be coupled with a summing voltage amplifier. The summing voltage amplifier may be coupled with an adaptive DC-offset and a lowpass filter, which, in turn, is coupled with a microcontroller. Accordingly, the demodulator circuit may be modular and/or scalable to include any number of levels (N-Levels) each including a peak detector, bandpass filter, and lowpass filter and control capacitor(s). For example, additional level(s) may be included in the demodulator circuit to increase the overall circuit's performance in terms of increasing modulation depth and/or controlling the waveform shape.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present application is illustrated by way of example and not limited in the accompanying figures in which like reference numerals indicate similar elements and in which.

DETAILED DESCRIPTION OF THE PREFERRED EMBODIMENTS

Figure 1:
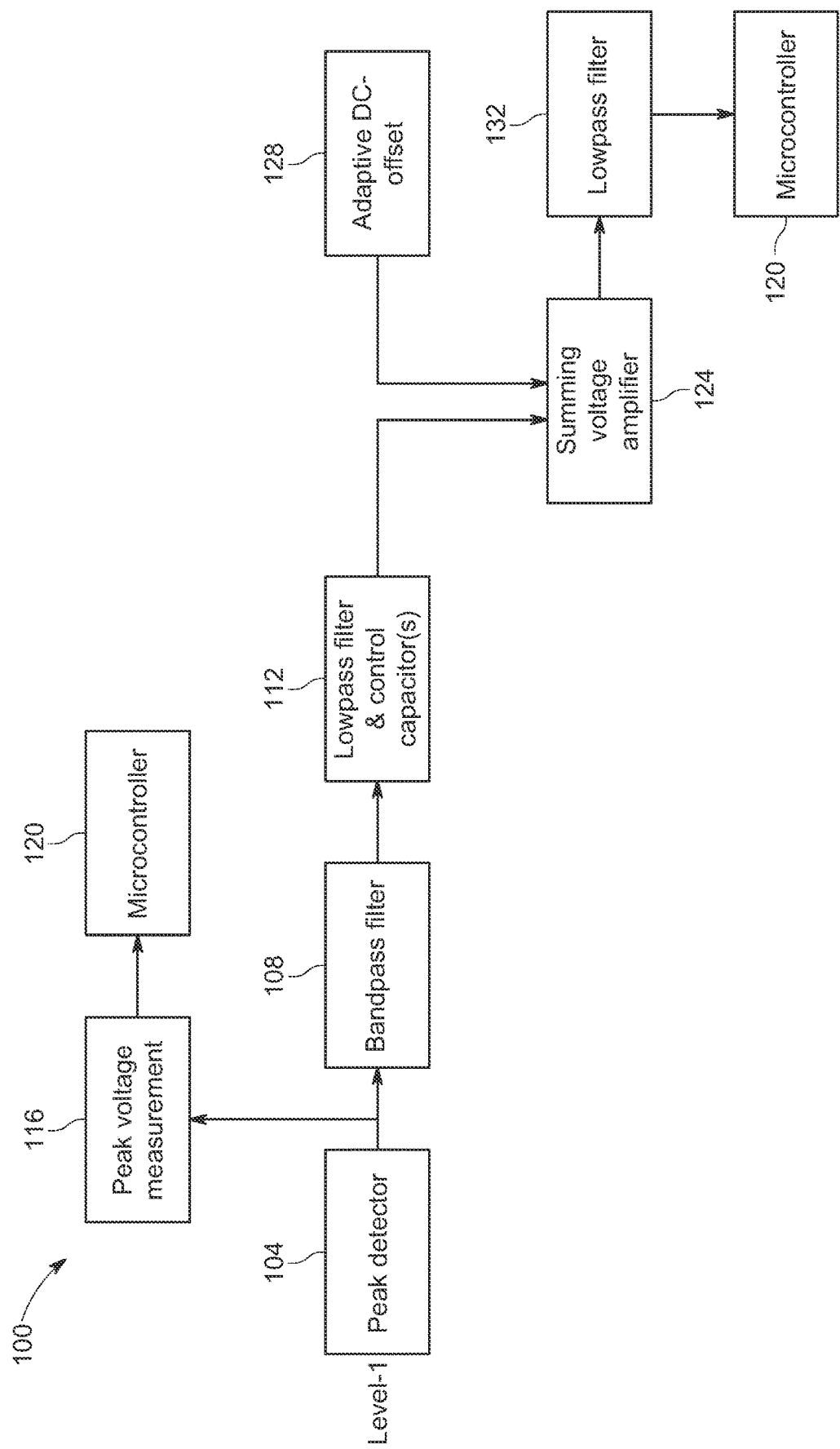
FIG. 1 is a block diagram illustrating an example 1-Level demodulator circuit for amplitude shift keying (ASK) communication demodulation according to an exemplary embodiment of the present disclosure.

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

Current 15 Watt (15 W) automotive wireless chargers operate at high z gap distances greater than 5 millimeters (mm). By comparison, other 15 W wireless chargers operate at much lower z gap distances. As recognized herein, however, the high z gap distances at which 15 W automotive wireless chargers operate may result in poor coupling factors (k). The coupling factor indicates how much magnetic flux from the transmitter coil reaches the receiver coil. The magnetic flux interaction takes place in the air gap between the coils. The value of the coupling factor ranges from 0 to 1. A coupling factor of 0 refers to decoupled coils. A coupling factor of 1 refers to a perfect coupling in which all magnetic flux from the transmitter coil penetrates to the receiver coil.

High z gap distances at which 15 W automotive wireless chargers operate may also result in the envelope of the message signal having extremely small depths that are incapable of being demodulated with state-of-the-art designs. Conventionally, the demodulation algorithm within a microcontroller may suffer from sporadic issues at demodulation depths lower than 15 millivolts (mV). When conventional resistive modulators are used at the receiver side, issues with the waveform shape and demodulation depth are seen at certain power levels which may cause the system to lose robustness and fail Qi compliance test.

After recognizing the above, exemplary embodiments of circuits were developed and/or are disclosed herein that enable high performance and/or improved amplitude shift keying (ASK) communication demodulation. The ASK communication demodulator circuits disclosed herein may overcome the above-identified challenges while also providing a greater degree of freedom in the design. For example, an ASK communication demodulator circuit may be configured to have multiple levels (N-levels) to thereby provide high control of desired waveform shape, demodulation depth, rise/fall times of waveform, and ripple noise within the waveform. The introduction of N-levels of demodulation adds in a safety factor in case a component within one of the multiple levels fails.

Exemplary embodiments of the ASK communication demodulator circuits disclosed herein may provide or include one or more (but not necessarily any or all) of the following advantages or features. For example, the ASK demodulation depth can be increased/magnified to any reasonable value with the change of magnification factor including above and beyond the requirements or specifications achievable with conventional solutions. Low coupling factor ASK message demodulation is enabled by the demodulator circuits disclosed herein, thereby making the system highly robust. Ripple/noise/waveform can be controlled with relative ease while keeping the demodulation depth high. Fixed adaptable DC-offset provides for better realization of the bits (e.g., algorithmically via an algorithm, etc.). Architectures using the ASK communication demodulator circuits disclosed herein may have a smaller footprint compared to current transformer/Rogowski coil (CT/RC) architectures. Multiple levels (N-levels) are possible for an ASK communication demodulator circuit disclosed herein, which strengthens Design Failure Mode and Effects Analysis (DFMEA.). With multilevels or N-levels of demodulation, the demodulator circuit can provide high control on the waveform in terms of shaping and depth. The ability to add multilevels or N-levels of demodulation to a demodulator circuit may enable future foolproof prorection as ripple/noise, waveform smoothness/slew rate and depth can be controlled with relative ease for unforeseen critical receiver(s).

Figure 2:
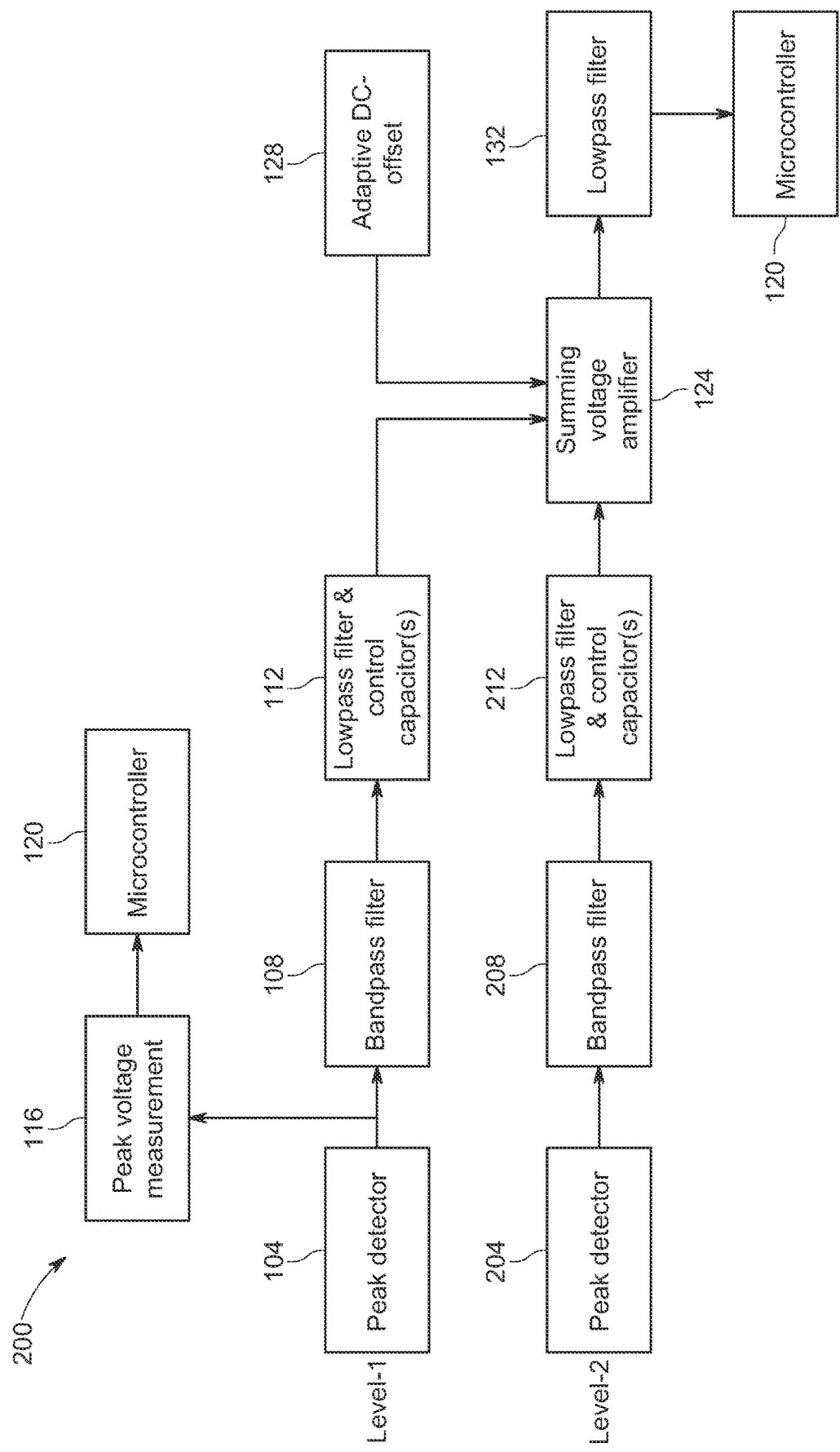
FIG. 2 is a block diagram illustrating an example 2-Level demodulator circuit for amplitude shift keying (ASK) communication demodulation according to an exemplary embodiment of the present disclosure.
Figure 3:
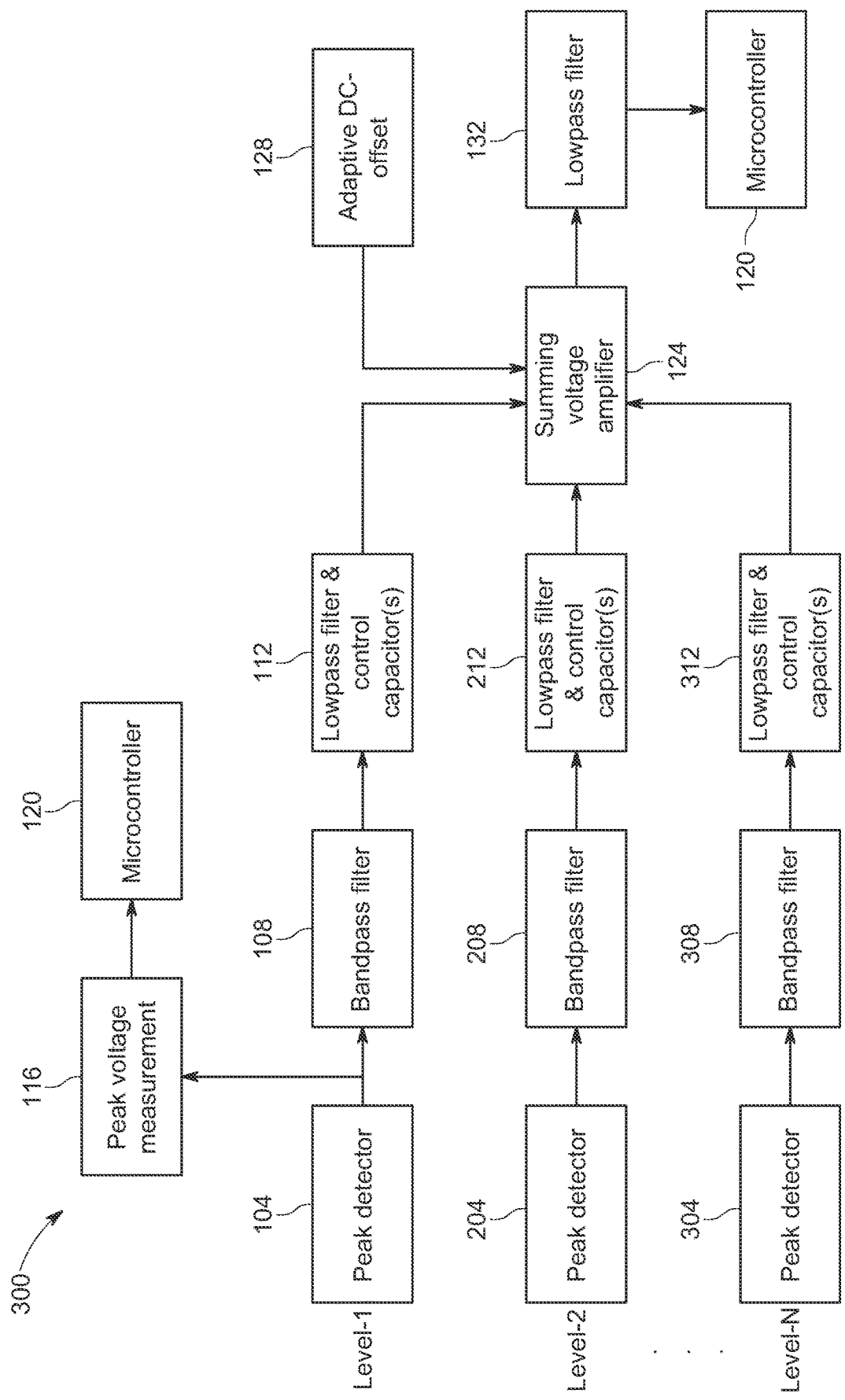
FIG. 3 is a block diagram illustrating an example N-level demodulator circuit for amplitude shift keying (ASK) communication demodulation according to an exemplary embodiment of the present disclosure.

With reference now to the figures, FIGS. 1-3 illustrates circuits 100, 200, and 300 for amplitude shift keying (ASK) communication demodulation according to exemplary embodiments of the present disclosure. As shown by a comparison of FIGS. 1, 2, and 3, the demodulator circuits may include any number of (one or more) levels (N-levels) of demodulation.

For example, FIG. 1 shows the demodulator circuit 100 configured to include only a single level (Level-1) that includes a peak detector 104, a bandpass filter 108, and a lowpass filter and control capacitor(s) 112. The bandpass filter 108 is coupled with and between the peak detector 104 and the lowpass filter and control capacitor(s) 112.

FIG. 2 shows the demodulator circuit 200 configured to include two levels (Level-1 and Level-2). The first level (Level-1) of the demodulator circuit 200 includes the same peak detector 104, bandpass filter 108, and lowpass filter and control capacitor(s) 112 shown in FIG. 1. The demodulator circuit 200 further includes a second level (Level-2) that includes a second peak detector 204, a second bandpass filter 208, and lowpass filter and control capacitor(s) 212.

FIG. 3 shows the demodulator circuit 300 configured to include more than two levels (Level-N). More specifically, the demodulator circuit 300 includes the same first and second levels (Level-1 and Level-2) shown in FIG. 2 that respectively include the first and second peak detectors 104 and 204, first and second bandpass filter 108 and 208, and first and second lowpass filters and control capacitors 112 and 212. The demodulator circuit 300 further includes one or more additional levels each including another peak detector 304, another bandpass filter 308, and another lowpass filter and control capacitor(s) 312.

Each level of the demodulator circuits 100, 200, and 300 may be identical to each other and include the same or similar components (e.g., peak detector, bandpass filter, lowpass filter and control capacitor(s)), although this is not required for all exemplary embodiments. For brevity, the demodulator circuit levels and their respective peak detectors, bandpass filters, and lowpass filters and control capacitor(s) will be described together.

The peak detector and bandpass filter are configured to be operable for removing the DC offset from an envelope message, e.g., from a receiver. The lowpass filter and control capacitor(s) are configured to allow smoothening and waveform shape forming as desired, which enables the demodulator circuit to provide control over waveform shaping and filtering.

Each illustrated demodulator circuit 100, 200, and 300 further includes a peak voltage measurement 116, a microcontroller 120, a summing voltage amplifier 124, an adaptive DC-offset 128, and a lowpass filter 132. For ease of illustrating the connections and communications between the microcontroller 120 and other components, the microcontroller 120 is identified at two different locations in the circuits 100, 200, and 300 though there is a single microcontroller 420 to which all signals received as an input.

The peak voltage measurement 116, summing voltage amplifier 124, adaptive DC-offset 128, lowpass filter 132, and microcontroller 120 (broadly, a controller or control unit) may be included with a demodulator circuit whether the demodulator circuit includes only a single level (FIG. 1), two levels (FIG. 2), or more than two levels (FIG. 3).

Each demodulator circuit level (Level-1, Level-2 . . . Level-N) is coupled with the summing voltage amplifier 124. The adaptive DC-offset 128 is coupled with the summing voltage amplifier 124. The summing voltage amplifier 124 is coupled with the lowpass filter 132, which, in turn, is coupled with the microcontroller 120.

The peak voltage measurement 116 is configured to be operable for measuring the peak of the voltage. The microcontroller 120 is coupled with the peak voltage measurement 116. For the peak voltage measurement, the microcontroller 120 is configured (e.g., algorithmically via an algorithm within the microcontroller 120, etc.) to link the analog values received to either the peak or RMS (root mean square) voltage seen at the resonant tank. This may then be used for protection to disable wireless charging at certain peak/rms voltages seen. The protection may be based on the power/voltage capability that the components chosen are able to handle and on the required safety level.

The summing voltage amplifier 124 introduces the required DC offset via the adaptive DC-offset 128, amplifies the signal to the required depth, and produces the waveform shape as set in the single-level or multilevel architecture based on the control capacitor and filter settings. The lowpass filter 132 operates to ensure that only the required frequencies of the bits are shown to the microcontroller 120. The microcontroller 120 is configured (e.g., algorithmically via an algorithm within the microcontroller 120, etc.) to decide if the received frequencies from the lowpass filter 132 are a bit 0 or bit 1 based on the specification chosen, e.g., Qi specification, etc.

A comparison of FIGS. 1, 2, and 3 generally shows the modularity and/or scalability of the demodulator circuits 100, 200, 300 in that any number of levels or modules including a peak detector, bandpass filter, and lowpass filter and control capacitor(s) may be added or introduced into a demodulator circuit to increase the overall circuit's performance in terms of increasing modulation depth and/or controlling the waveform shape. The additional levels or modules may be coupled with and share common components of the demodulator circuit, e.g., the peak voltage measurement 116, microcontroller 120, summing voltage amplifier 124, adaptive DC-offset 128, and lowpass filter 132.

Figure 4:
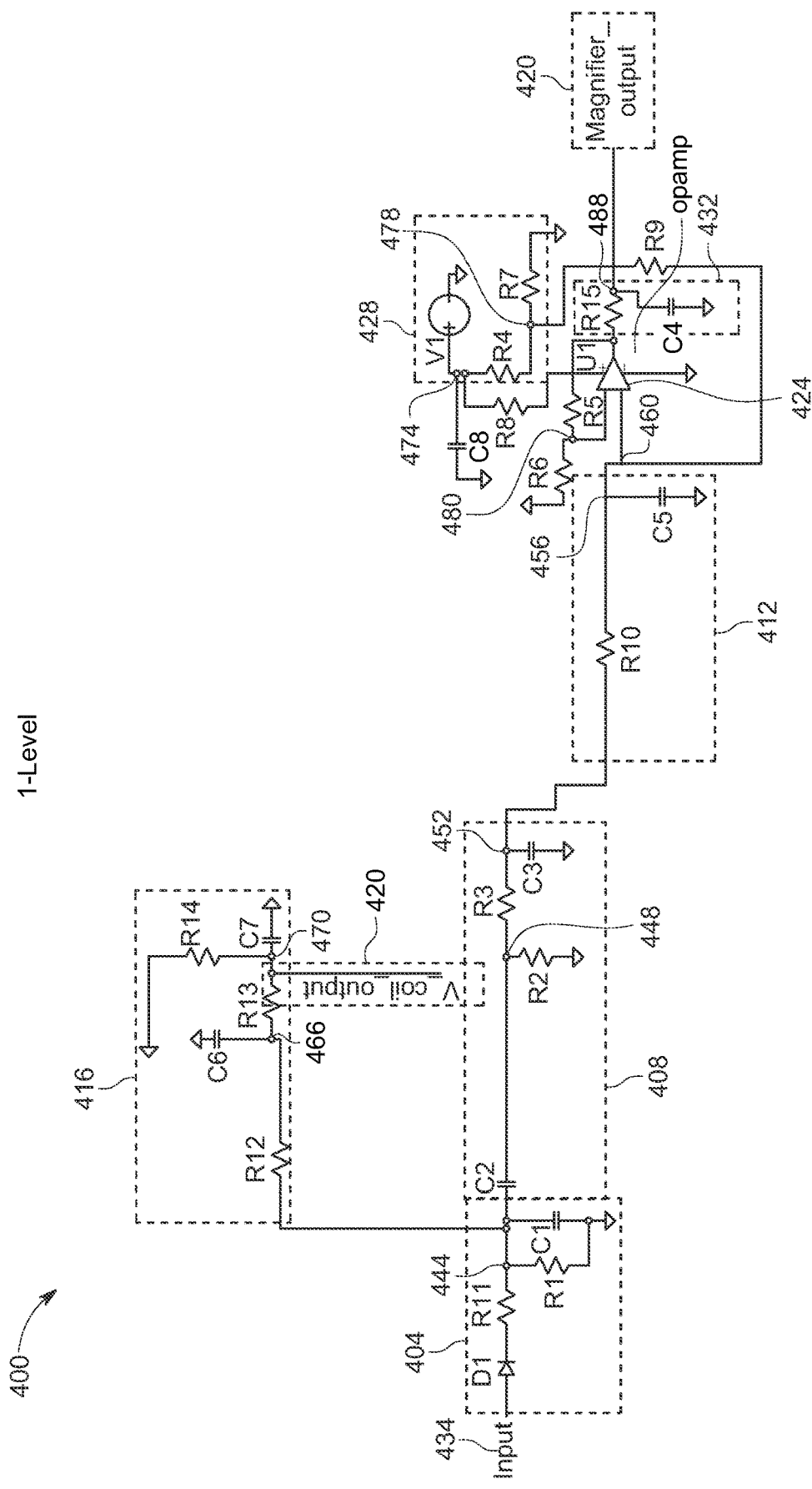
FIG. 4 is a circuit diagram illustrating an example 1-Level demodulator circuit for amplitude shift keying (ASK) communication demodulation according to an exemplary embodiment of the present disclosure.

FIG. 4 illustrates an example 1-Level demodulator circuit 400 according to an exemplary embodiment of the present disclosure. The demodulator circuit 400 includes a diode D1, a plurality of resistors (broadly, resistances) R1 through R15, and a plurality of capacitors C1 through C7, which define and/or are part of the various components of the demodulator circuit 400 as disclosed hereinafter.

The demodulator circuit 400 includes a peak detector 404, a bandpass filter 408, and a lowpass filter and control capacitor(s) 412. The bandpass filter 408 is coupled with and between the peak detector 404 and the lowpass filter and control capacitor(s) 412. The peak detector 404 and bandpass filter 408 are configured to be operable for removing the DC offset from an envelope message, e.g., from a receiver. The lowpass filter and control capacitor(s) 412 are configured to allow smoothening and waveform shape forming as desired, which enables the demodulator circuit 400 to provide control over waveform shaping and filtering.

The demodulator circuit 400 further includes a peak voltage measurement 416, a microcontroller 420, a summing voltage amplifier 424, an adaptive DC-offset 428, and a lowpass filter 432. For ease of illustrating the connections and communications between the microcontroller 420 and other components, the microcontroller 420 is identified at two different locations in the circuit 400 though there is a single microcontroller 420 to which all signals received as an input.

The first level (e.g., peak detector 404, bandpass filter 408, lowpass filter and control capacitor(s) 412) of the demodulator circuit 400 is coupled with the summing voltage amplifier 424. The adaptive DC-offset 428 is coupled with the summing voltage amplifier 424. The summing voltage amplifier 424 is coupled with the lowpass filter 432, which, in turn, is coupled with the microcontroller 420.

The peak voltage measurement 416 is configured to be operable for measuring the peak of the voltage. The microcontroller 420 is coupled with the peak voltage measurement 416. For the peak voltage measurement, the microcontroller 420 is configured (e.g., algorithmically via an algorithm within the microcontroller 420, etc.) to link the analog values received to either the peak or RMS (root mean square) voltage seen at the resonant tank. This may then be used for protection to disable wireless charging at certain peak/rms voltages seen. The protection may be based on the power/voltage capability that the components chosen are able to handle and on the required safety level.

The summing voltage amplifier 424 introduces the required DC offset via the adaptive DC-offset 428, amplifies the signal to the required depth, and produces the waveform shape as set in the single-level or multilevel architecture based on the control capacitor and filter settings. The lowpass filter 432 operates to ensure that only the required frequencies of the bits are shown to the microcontroller 420. The microcontroller 420 is configured (e.g., algorithmically via an algorithm within the microcontroller 120, etc.) to decide if the received frequencies from the lowpass filter 432 are a bit 0 or bit 1 based on the specification chosen, e.g., Qi specification, etc.

In this illustrated embodiment, the peak detector 404 includes or is defined by the diode D1, resistors R11 and R1, and capacitor C1. The diode D1 is coupled in series with an input 434. The resistor R11 is coupled in series with the diode D1, resistor R1, and capacitor C1. The resistor R1 is coupled in parallel with the capacitor C1. A node 444 is defined between the resistor R11, resistor R1, capacitor C1, and the peak voltage measurement 416.

The bandpass filter 408 is coupled in series with the peak detector 404. The bandpass filter 408 includes or is defined by the capacitor C2, resistors R2 and R3, and capacitor C3. The capacitor C2 is coupled in series with the input 434 via a path through the resistor R11 and diode D1. The resistor R3 is coupled in series with the capacitor C2 and resistor R3 such that a node 448 is defined between the capacitor C2 and resistors R2 and R3. The resistor R3 is also coupled in series with the capacitor C3 and resistor R10 such that a node 452 is defined between the capacitor C3 and resistors R3 and R10.

The lowpass filter and control capacitor(s) 412 is coupled in series with the bandpass filter 408. The lowpass filter and control capacitor(s) 412 includes or is defined by the resistor R10 and capacitor C5. The resistor R10 is coupled in series with the capacitor C5, such that a node 456 is defined between the resistor R10 and capacitor C5. A node 460 is also defined between the lowpass filter and control capacitor(s) 412, the summing voltage amplifier 424, and the resistor R9. Although FIG. 4 illustrates a single capacitor C5 included within the lowpass filter and control capacitor(s) 412, other exemplary embodiments may be configured differently such that lowpass filter and control capacitor(s) 412 includes multiple capacitors in parallel instead of the single capacitor C5.

The peak voltage measurement 416 includes or is defined by the resistors R12, R13, and R14 and capacitors C6 and C7. The resistor R12 is coupled in series with the capacitor C6 and R13, such that a node 466 is defined between the resistor R12, resistor R13, and capacitor C6. The resistor R13 is coupled in series with the capacitor C7 and resistor R14, such that a node 470 is defined between the resistor R13, resistor R14, and capacitor C7. The microcontroller 420 is coupled with the peak voltage measurement 416 between the node 470 and the resistor R13.

The adaptive DC-Offset 428 includes or is defined by a voltage source V1 coupled in series with the resistor R4, which, in turn, is coupled in series with the resistor R7. The voltage source V1 is also coupled in series with the capacitor C8 and with the resistor R8. The resistor R8 is coupled in series with the summing voltage amplifier 424. The resistor R9 is coupled in series with the resistor R4 and with the resistor R8. One or more nodes 474 are defined between the voltage source V1, capacitor C8, and resistors R4 and R8. A node 478 is also defined between the resistors R4, R7, and R9.

The summing voltage amplifier 424 is coupled in parallel with the resistor R5. The resistor R6 is coupled in series with the summing voltage amplifier 424 and with the resistor R5. A node 480 is defined between the summing voltage amplifier 424 and the resistors R5 and R6.

The lowpass filter 432 includes or is defined by the resistor R15 and capacitor C4. The resistor R15 is coupled in series with the summing voltage amplifier 424 and the resistor R5, such that a node 484 is defined between the summing voltage amplifier 424 and the resistors R5 and R15. The resistor R15 is also coupled in series with the microcontroller 420 and the capacitor C4, such that a node 488 is defined between the microcontroller 420, resistor R15, and capacitor C4.

By way of example only, the diode D1 may comprise a high-speed switching diode. In alternative embodiments, the diode D1 may be replaced with a metal-oxide-semiconductor field-effect transistors (MOSFETs) and/or one or more high order lowpass filters may be used in the demodulator circuit 400.

In other exemplary embodiments, each line or level of demodulation of the demodulator circuit (e.g., having a multi-level architecture, etc.) may include a switch coupled in series with and between the diode D1 and the input 434 along each line or level or demodulation, to thereby allow for individually selecting a particular line or level of demodulation, e.g., via a Multimode Wireless Communication Terminal (MWCT) or logic, etc. Each line or level of demodulation of the demodulator circuit may include one or more additional resistors and capacitors in parallel with the resistor R1 and capacitor C1 and in series with switches, to thereby allow for dynamically changing the frequency response of a particular line or level of demodulation. For example, each line or level of demodulation of the demodulator circuit may include a switchable resistor and capacitor to change the frequency response of that line or level of demodulation. The demodulator circuit may include additional resistors in parallel to resistors R5, R6, R4, and R7 and in series with switches, to thereby allow for changing amplification or magnification factor and DC adaptive offset dynamically, e.g., via a MWCT or logic, etc.

In exemplary embodiments, the demodulator circuit (e.g., 700 (FIG. 7), 800 (FIG. 8), 900 (FIG. 9), etc.) includes multiple switches and multiple available selections of resistors/capacitors. These optional switches are in series with their corresponding component (e.g., resistor, capacitor) and their exact positioning is not necessarily fixed or required at specific positions within the demodulator circuit.

Figure 5:
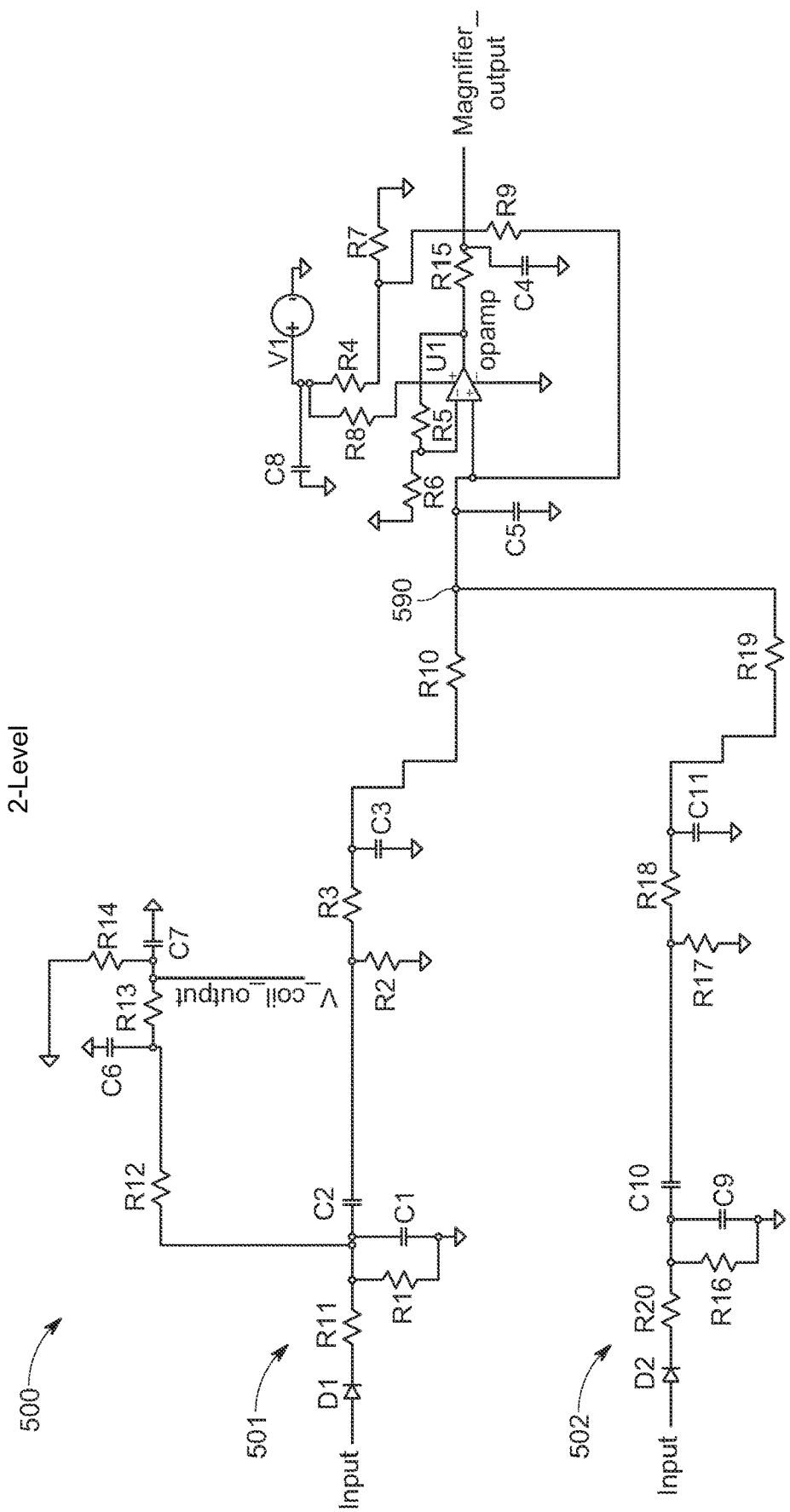
FIG. 5 is a circuit diagram illustrating an example 2-Level demodulator circuit for amplitude shift keying (ASK) communication demodulation according to an exemplary embodiment of the present disclosure.

FIG. 5 illustrates an example 2-Level demodulator circuit 500 according to an exemplary embodiment of the present disclosure. The demodulator circuit 500 includes a plurality of diodes D1 and D2, a plurality of resistors (broadly, resistances) R1 through R20, and a plurality of capacitors C1 through C11, which define and/or are part of the various components of the first level 501 and second level 502 of the demodulator circuit 500.

Each level 501, 502 of the demodulator circuit 500 includes a peak detector, a bandpass filter, and a lowpass filter and control capacitor(s), which may be identical or substantially similar to the corresponding peak detector 404, bandpass filter 408, lowpass filter and control capacitor(s) 412 shown in FIG. 4 and described above. For brevity, the peak detector, the bandpass filter, and the lowpass filter and control capacitor(s) of each level 501, 502 of the demodulator circuit 500 will therefore not be described in detail.

The demodulator circuit 500 further includes a peak voltage measurement, a microcontroller, a summing voltage amplifier, an adaptive DC-offset, and a lowpass filter, which may be identical or substantially similar to the corresponding peak voltage measurement 416, microcontroller 420, summing voltage amplifier 424, adaptive DC-offset 428, and lowpass filter 432 shown in FIG. 4 and described above. For brevity, the peak voltage measurement, microcontroller, summing voltage amplifier, adaptive DC-offset, and lowpass filter of the demodulator circuit 500 will therefore not be described again in detail.

As shown in FIG. 5, the second level 502 of the demodulator circuit 500 is coupled with the lowpass filters and control capacitor(s) of the first level 501. The resistor R19 of the second level's lowpass filters and control capacitor(s) are coupled with the resistor R10 and capacitor C5 of the first level's lowpass filters and control capacitor(s), such that a node 590 is defined between the resistor R19 and the resistor R10 and capacitor C5.

Except for the second level 502 not having a capacitor corresponding to capacitor C5 of the first level 501, the first and second levels 501, 502 of the demodulator circuit 500 may be identical or substantially similar to each other. In other exemplary embodiments, the second level 502 may further include a capacitor corresponding to capacitor C5 and/or the first and second levels 501, 502 may include multiple capacitors in parallel.

By way of example only, the diodes D1 and D2 may comprise high-speed switching diodes. In alternative embodiments, one or more of the diodes D1, D2 may be replaced with one or more metal-oxide-semiconductor field-effect transistors (MOSFETs) and/or one or more high order lowpass filters may be used in the demodulator circuit 500.

Figure 6:
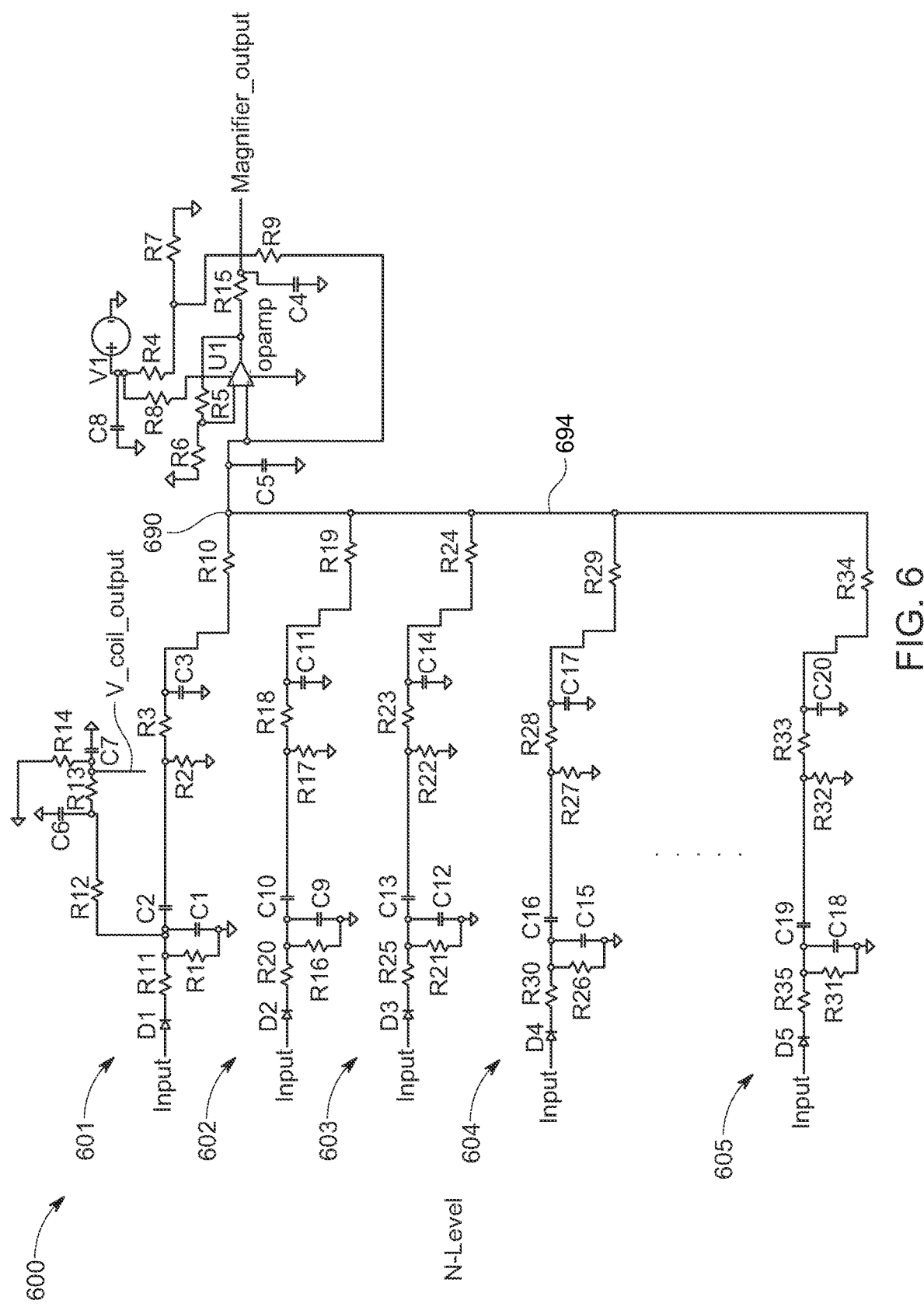
FIG. 6 is a circuit diagram illustrating an example N-level demodulator circuit for amplitude shift keying (ASK) communication demodulation according to an exemplary embodiment of the present disclosure.

FIG. 6 illustrates an example N-Level demodulator circuit 600 according to an exemplary embodiment of the present disclosure. Although FIG. 6 illustrates that the demodulator circuit 600 includes fives levels 601, 602, 603, 604, 605, alternative embodiments may include any number of levels (N-levels) of demodulation including more than five levels or less than five levels.

The demodulator circuit 600 includes a plurality of diodes D1 through D5, a plurality of resistors (broadly, resistances) R1 through R35, and a plurality of capacitors C1 through C20, which define and/or are part of the various components of the illustrated five levels of the demodulator circuit 600.

Each level 601, 602, 603, 604, and 605 of the demodulator circuit 600 includes a peak detector, a bandpass filter, and a lowpass filter and control capacitor(s), which may be identical or substantially similar to the corresponding peak detector 404, bandpass filter 408, lowpass filter and control capacitor(s) 412 shown in FIG. 4 and described above. For brevity, the peak detector, the bandpass filter, and the lowpass filter and control capacitor(s) of each level 601, 602, 603, 604, and 605 of the demodulator circuit 600 will therefore not be described again in detail.

The demodulator circuit 600 further includes a peak voltage measurement, a microcontroller, a summing voltage amplifier, an adaptive DC-offset, and a lowpass filter, which may be identical or substantially similar to the corresponding peak voltage measurement 416, microcontroller 420, summing voltage amplifier 424, adaptive DC-offset 428, and lowpass filter 432 shown in FIG. 4 and described above. For brevity, the peak voltage measurement, microcontroller, summing voltage amplifier, adaptive DC-offset, and lowpass filter of the demodulator circuit 600 will therefore not be described in detail.

As shown in FIG. 6, the second, third, fourth, and fifth levels 602, 603, 604, 605 of the demodulator circuit 600 are coupled with the lowpass filters and control capacitor(s) of the first level 601. The resistors R19, R24, R29, and R34 are coupled with the resistor R10 and capacitor C5 of the first level's lowpass filters and control capacitor(s), such that a node 690 is defined between the resistors R19 and the path 694 coupling the resistors R19, R24, R29, and R34 to the node 690.

Except for the second, third, fourth, and fifth levels 602, 603, 604, 605 not having capacitors corresponding to capacitor C5 of the first level 601, the first, second, third, fourth, and fifth levels 601, 602, 603, 604, 605 of the demodulator circuit 500 may be identical or substantially similar to each other. In other exemplary embodiments, one or more of the second, third, fourth, and fifth levels 602, 603, 604, 605 may include a capacitor(s) corresponding to capacitor C5 and/or the first, second, third, fourth, and fifth levels 601, 602, 603, 604, 605 may include multiple capacitors in parallel.

By way of example only, the diodes D1 through D5 may comprise high-speed switching diodes. In alternative embodiments, one or more of the diodes D1, D2, D3, D4, D5 may be replaced with one or more metal-oxide-semiconductor field-effect transistors (MOSFETs) and/or one or more high order lowpass filters may be used in the demodulator circuit 600.

Figure 7:
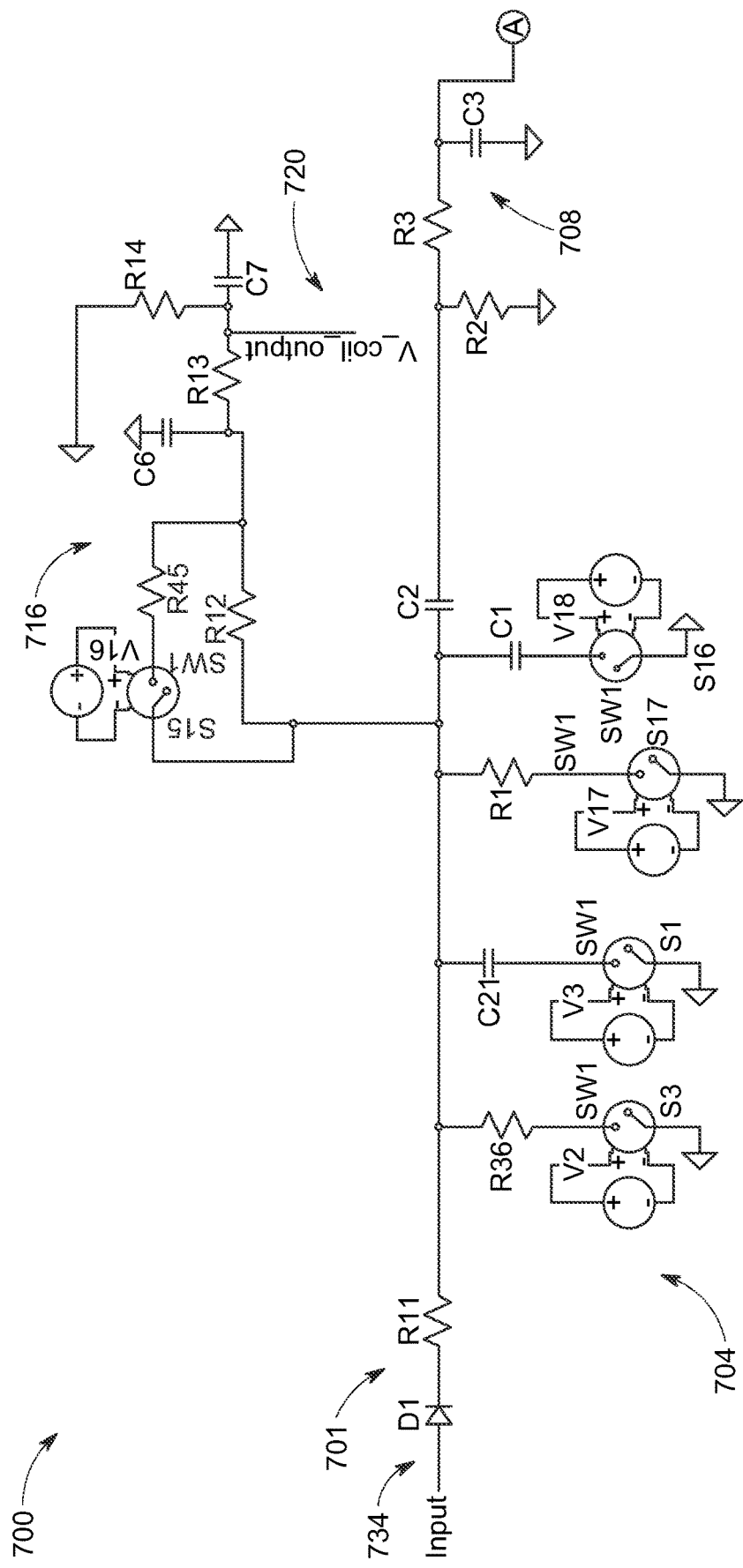
FIG. 7 is a circuit diagram illustrating an example 1-Level demodulator circuit for amplitude shift keying (ASK) communication demodulation according to an exemplary embodiment of the present disclosure.
Figure 7:
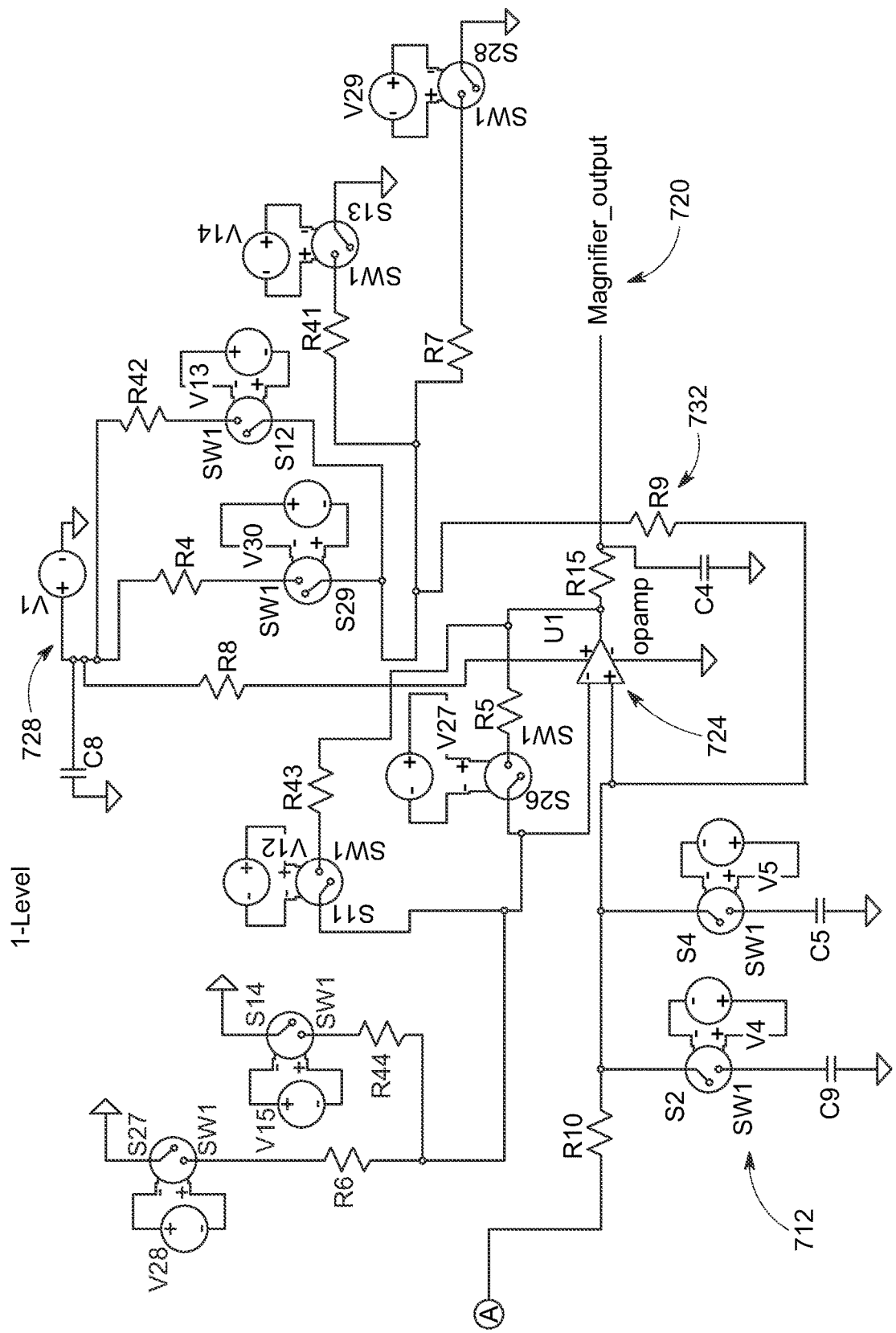

FIG. 7 illustrates an example 1-Level demodulator circuit 700 according to an exemplary embodiment of the present disclosure. The demodulator circuit 700 includes a diode D1, a plurality of resistors (broadly, resistances) R1 through R15, and a plurality of capacitors C1 through C7, which define and/or are part of the various components of the line or level 701 of the demodulator circuit 700. In this illustrated embodiment, the demodulator circuit 700 also includes multiple switches and multiple available selections of resistors/capacitors as disclosed hereinafter.

The demodulator circuit 700 includes a peak detector 704, a bandpass filter 708, and a lowpass filter and control capacitor(s) 712, which may be identical or substantially similar to the corresponding peak detector 404, bandpass filter 408, lowpass filter and control capacitor(s) 412 shown in FIG. 4 and described above. For brevity, the peak detector 704, bandpass filter 708, and lowpass filter and control capacitor(s) 712 of the demodulator circuit 700 will therefore not be described in detail.

The demodulator circuit 700 further includes a peak voltage measurement 716, a microcontroller 720, a summing voltage amplifier 724, an adaptive DC-offset 728, and a lowpass filter 732, which may be identical or substantially similar to the corresponding peak voltage measurement 416, microcontroller 420, summing voltage amplifier 424, adaptive DC-offset 428, and lowpass filter 432 shown in FIG. 4 and described above. For brevity, the peak voltage measurement 716, microcontroller 720, summing voltage amplifier 724, adaptive DC-offset 728, and lowpass filter 732 of the demodulator circuit 700 will therefore not be described again in detail.

The demodulator circuit 700 includes switches SW1 in series with the resistor R1 and capacitor C1 of the peak detector 704. An additional resistor R36 and capacitor C21 are in parallel with the resistor R1 and capacitor C1. The resistor R36 and capacitor C21 are each in series with a switch SW1, to thereby allow for dynamically changing the frequency response of this line or level of demodulation 701. In multi-level demodulation circuits (e.g., FIGS. 8 and 9, etc.), each line or level of demodulation of the demodulator circuit may include a switchable resistor and capacitor to change the frequency response of that line or level of demodulation.

The demodulator circuit 700 further includes additional resistors R41, R42, R43, and R44, respectively in parallel to resistors R7, R4, R5, and R6. The additional resistors R41, R42, R43, and R44 are each in series with a switch, to thereby allow for changing amplification or magnification factor and DC adaptive offset dynamically, e.g., via a MWCT or logic, etc.

The peak voltage measurement 716 includes an additional resistor R45 in parallel to resistor R12 and in series with a switch, to thereby allow for changing to thereby allow for changing peak voltage when dynamic change in frequency response is selected in any of lines to ensure appropriate voltage level is supplied to microcontroller. The additional resistor R45 or switch is to ensure that when the frequency response line is changed, there is a change in the peak voltage to the microcontroller. Generally, the voltage to microcontroller should be configured to be below 3.3V/5V depending on the microcontroller pin voltage capability, which level should not be exceeded by selecting the appropriate resistance.

In this exemplary embodiment, the demodulator circuit 700 includes a switch in series with the capacitor C5. The demodulator circuit 700 also includes an additional switch in series with a capacitor C9, which is in parallel with capacitor C5. The speed of the demodulation signal waveform/control factor is further controllable by dynamically changing the switchable capacitors C5 and C9. In the example, only two selectable capacitors C5 and C9 are shown in FIG. 7. In alternative embodiments, a lower number of selectable capacitors (e.g., a single switchable capacitor C5) or a higher number of selectable capacitors (e.g., more than two switchable capacitors) may be included depending on the application. As recognized herein, higher capacitance will result in slower response while lower capacitance will result in faster response. Thus, the selectable capacitors C5 and C9 can be used dynamically depending on the load reflected from the receiver.

The demodulator circuit 700 further includes additional switches in series with the resistors R4, R5, R6, R7. The demodulator circuit 700 may further include a switch coupled in series with and between the diode D1 and the input 734 along each line or level or demodulation, to thereby allow for individually selecting a particular line or level of demodulation, e.g., via a Multimode Wireless Communication Terminal (MWCT) or logic, etc. Accordingly, demodulator circuits disclosed herein may include multiple switches and multiple available selections of resistors/capacitors.

Figure 8:
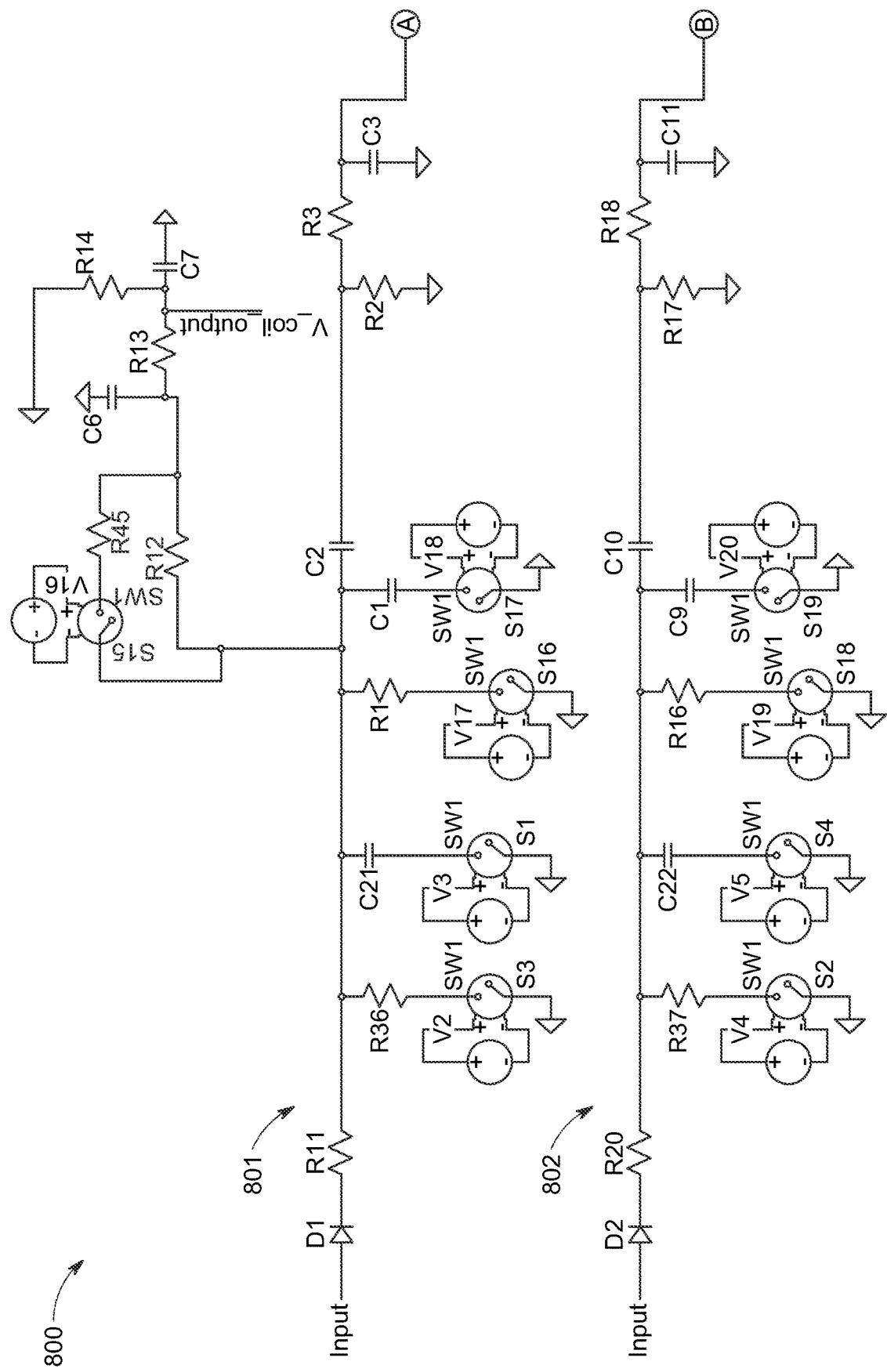
FIG. 8 is a circuit diagram illustrating an example 2-Level demodulator circuit for amplitude shift keying (ASK) communication demodulation according to an exemplary embodiment of the present disclosure.
Figure 8:
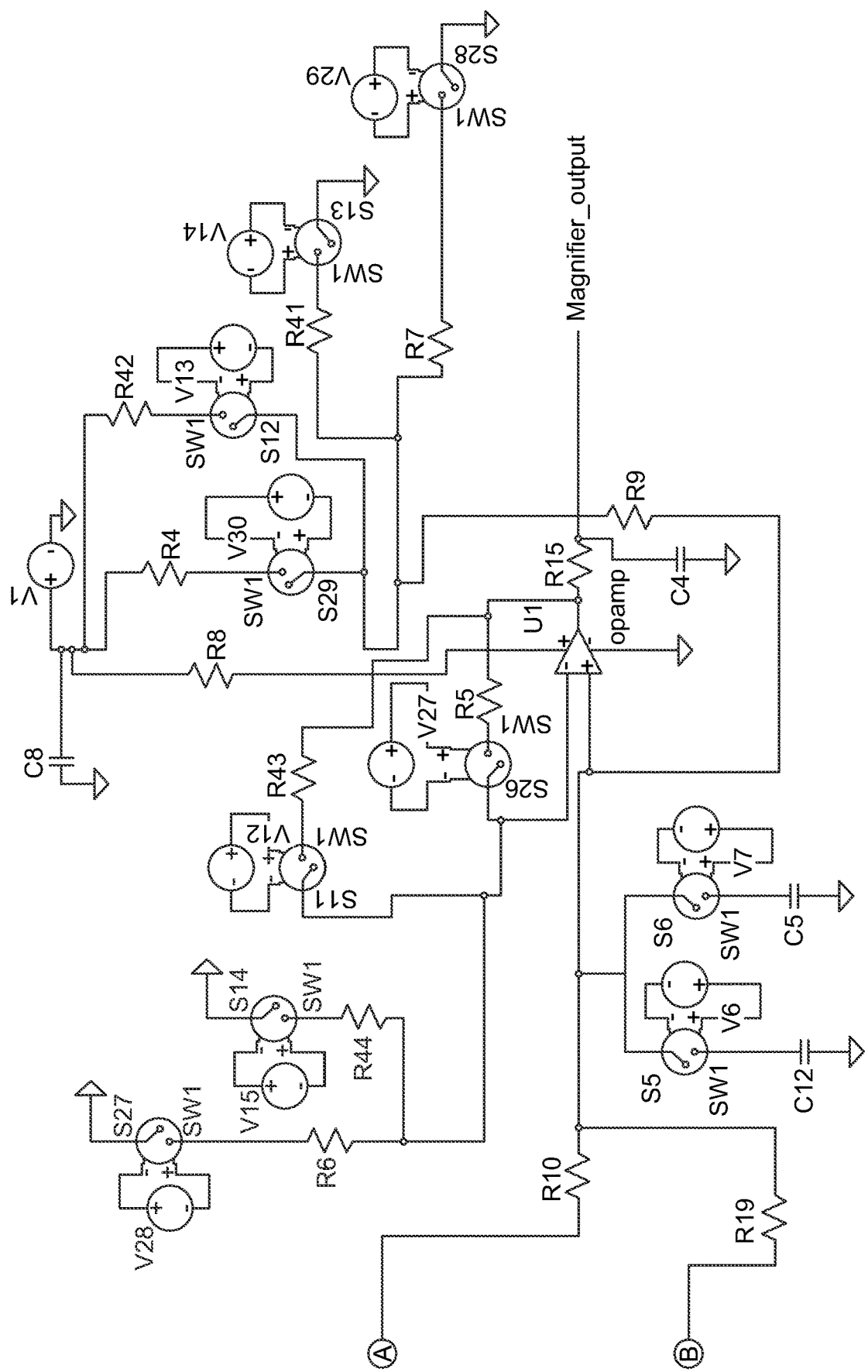
Figure 9:
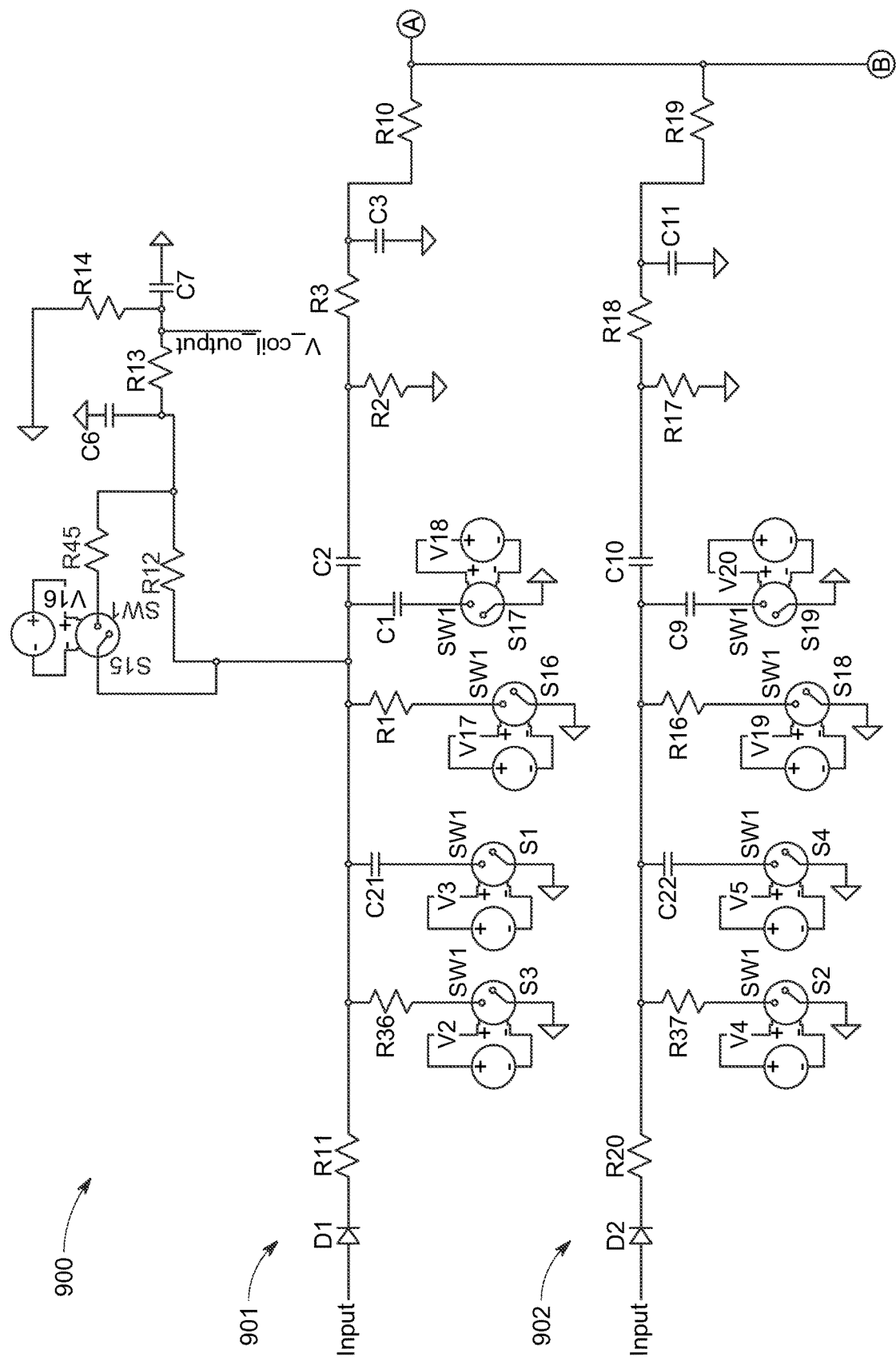
FIG. 9 is a circuit diagram illustrating an example N-level demodulator circuit for amplitude shift keying (ASK) communication demodulation according to an exemplary embodiment of the present disclosure.
Figure 9:
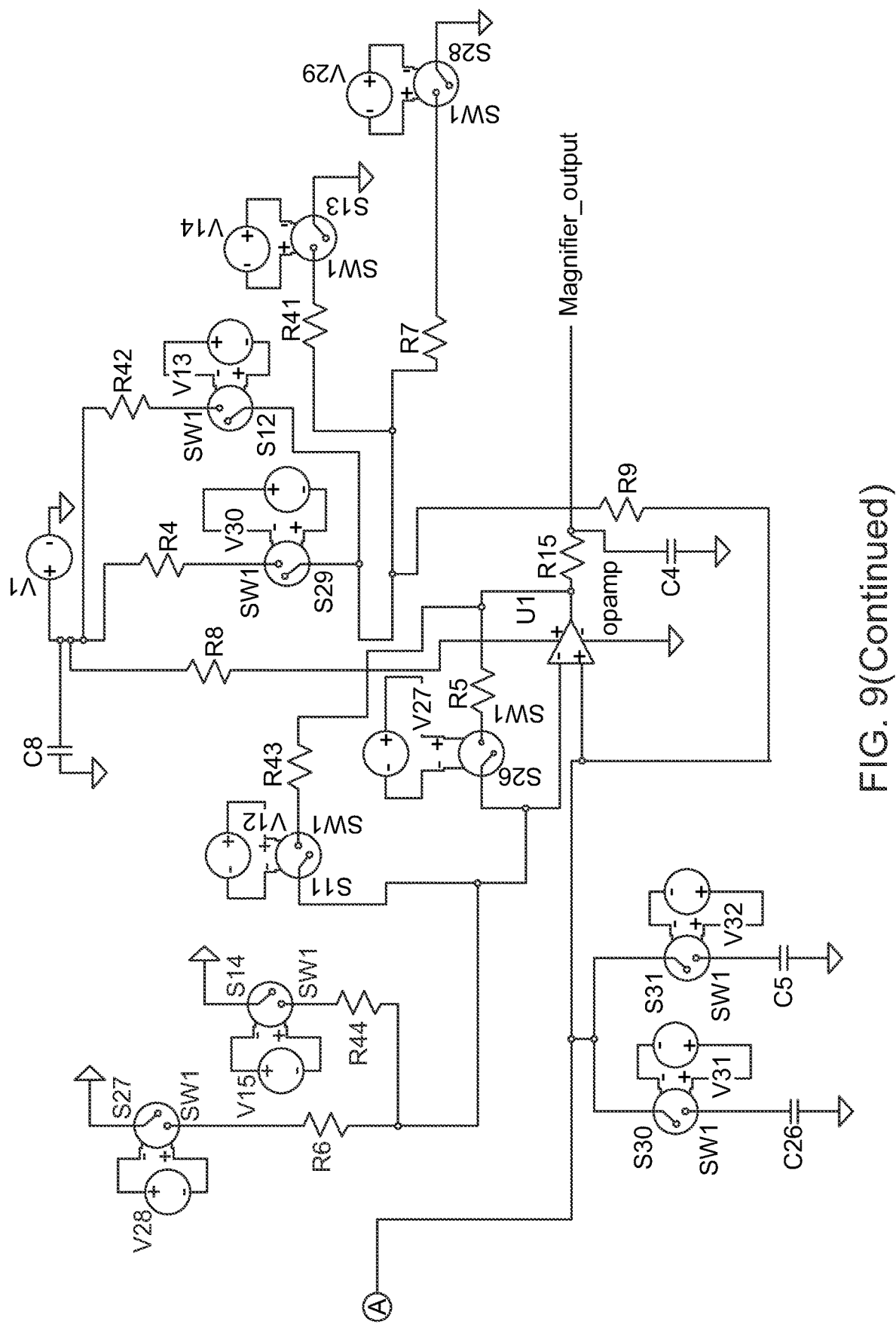
Figure 9:
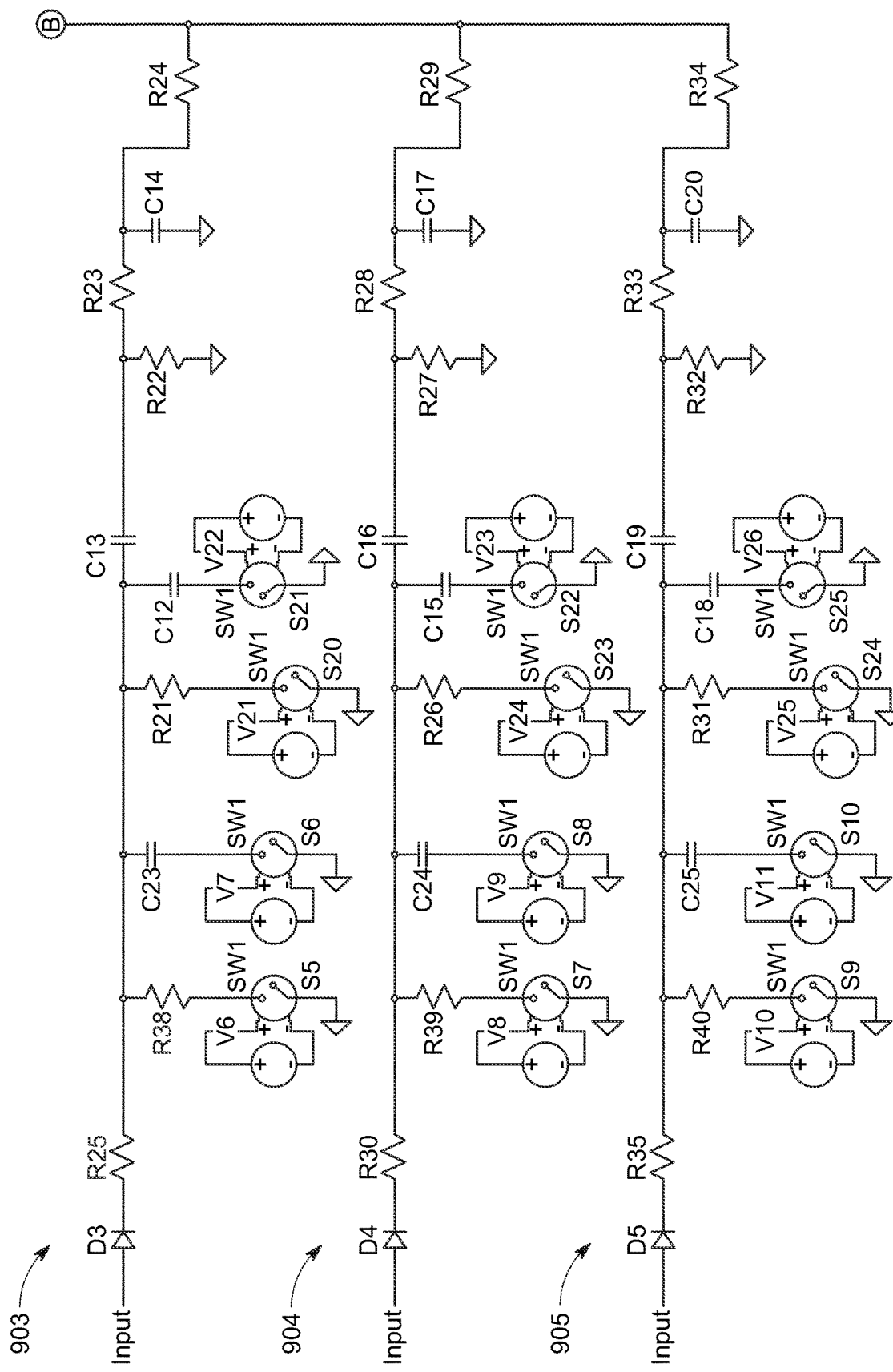

FIG. 7 shows the various switches in an open configuration in which the switches are not being energized by their corresponding voltage sources such that their corresponding switchable components (e.g., switchable resistors and capacitors) are not selected. The demodulation circuit 700 is reconfigurable by actively selecting the switchable resistors and capacitors by closing the corresponding switches after being energized by their corresponding voltage sources. The switches shown in FIGS. 7, 8, and 9 are examples only as other switch types may be used in other exemplary embodiments. In addition, any one or more or all of the switches may be removed and/or only single elements may be used in other exemplary embodiments. See, for example, capacitor C5 in FIG. 4 and the switchable capacitors C5 and C9 in FIG. 7.

FIG. 8 illustrates an example 2-Level demodulator circuit 800 according to an exemplary embodiment of the present disclosure. The demodulator circuit 800 includes a plurality of diodes D1 and D2, a plurality of resistors (broadly, resistances) R1 through R20, and a plurality of capacitors C1 through C11, which define and/or are part of the various components of the first level 801 and second level 802 of the demodulator circuit 800. Similar to the demodulator circuit 700, the demodulator circuit 800 also includes multiple switches and multiple available selections of resistors/capacitors.

Each level 801, 802 of the demodulator circuit 800 includes a peak detector, a bandpass filter, and a lowpass filter and control capacitor(s), which may be identical or substantially similar to the corresponding peak detector 704, bandpass filter 708, lowpass filter and control capacitor(s) 712 shown in FIG. 7 and described above. For brevity, the peak detector, the bandpass filter, and the lowpass filter and control capacitor(s) of each level 801, 802 of the demodulator circuit 800 will therefore not be described in detail.

The demodulator circuit 800 further includes a peak voltage measurement, a microcontroller, a summing voltage amplifier, an adaptive DC-offset, and a lowpass filter, which may be identical or substantially similar to the corresponding peak voltage measurement 716, microcontroller 720, summing voltage amplifier 724, adaptive DC-offset 728, and lowpass filter 732 shown in FIG. 7 and described above. For brevity, the peak voltage measurement, microcontroller, summing voltage amplifier, adaptive DC-offset, and lowpass filter of the demodulator circuit 800 will therefore not be described again in detail.

As shown in FIG. 8, the second level 802 of the demodulator circuit 800 is coupled with the lowpass filters and control capacitor(s) of the first level 801. The resistor R19 of the second level's lowpass filters and control capacitor(s) are coupled with the resistor R10 and switchable capacitors C5 and C12 of the first level's lowpass filters and control capacitor(s), such that a node is defined between the resistor R19 and the resistor R10 and switchable capacitors C5 and C12.

Except for the second level 802 not having a capacitor corresponding to switchable capacitors C5 and C12 of the first level 801, the first and second levels 801, 802 of the demodulator circuit 800 may be identical or substantially similar to each other. In other exemplary embodiments, the second level 802 may further include switchable capacitors corresponding to switchable capacitor C5 and C12 and/or the first and second levels 801, 802 may include multiple capacitors in parallel.

By way of example only, the diodes D1 and D2 may comprise high-speed switching diodes. In alternative embodiments, one or more of the diodes D1, D2 may be replaced with one or more metal-oxide-semiconductor field-effect transistors (MOSFETs) and/or one or more high order lowpass filters may be used in the demodulator circuit 800.

FIG. 9 illustrates an example N-Level demodulator circuit 900 according to an exemplary embodiment of the present disclosure. Although FIG. 9 illustrates that the demodulator circuit 900 includes fives levels 901, 902, 903, 904, 905, alternative embodiments may include any number of levels (N-levels) of demodulation including more than five levels or less than five levels.

The demodulator circuit 900 includes a plurality of diodes D1 through D5, a plurality of resistors (broadly, resistances) R1 through R35, and a plurality of capacitors C1 through C20, which define and/or are part of the various components of the illustrated five levels of the demodulator circuit 900. Similar to the demodulator circuit 700, the demodulator circuit 900 also includes multiple switches and multiple available selections of resistors/capacitors.

Each level 901, 902, 903, 904, and 905 of the demodulator circuit 900 includes a peak detector, a bandpass filter, and a lowpass filter and control capacitor(s), which may be identical or substantially similar to the corresponding peak detector 704, bandpass filter 708, lowpass filter and control capacitor(s) 712 shown in FIG. 7 and described above. For brevity, the peak detector, the bandpass filter, and the lowpass filter and control capacitor(s) of each level 901, 902, 903, 904, and 905 of the demodulator circuit 900 will therefore not be described again in detail.

The demodulator circuit 900 further includes a peak voltage measurement, a microcontroller, a summing voltage amplifier, an adaptive DC-offset, and a lowpass filter, which may be identical or substantially similar to the corresponding peak voltage measurement 716, microcontroller 720, summing voltage amplifier 724, adaptive DC-offset 728, and lowpass filter 732 shown in FIG. 7 and described above. For brevity, the peak voltage measurement, microcontroller, summing voltage amplifier, adaptive DC-offset, and lowpass filter of the demodulator circuit 900 will therefore not be described in detail.

As shown in FIG. 9, the second, third, fourth, and fifth levels 902, 903, 904, 905 of the demodulator circuit 900 are coupled with the lowpass filters and control capacitor(s) of the first level 901. The resistors R19, R24, R29, and R34 are coupled with the resistor R10 and switchable capacitors C5 and C26 of the first level's lowpass filters and control capacitor(s), such that a node is defined between the resistors R19 and the path coupling the resistors R19, R24, R29, and R34 to the node.

Except for the second, third, fourth, and fifth levels 902, 903, 904, 905 not having capacitors corresponding to switchable capacitors C5 and C26 of the first level 901, the first, second, third, fourth, and fifth levels 901, 902, 903, 904, 905 of the demodulator circuit 500 may be identical or substantially similar to each other. In other exemplary embodiments, one or more of the second, third, fourth, and fifth levels 902, 903, 904, 905 may include switchable capacitor(s) corresponding to switchable capacitors C5 and C26 and/or the first, second, third, fourth, and fifth levels 901, 902, 903, 904, 905 may include multiple capacitors in parallel.

By way of example only, the diodes D1 through D5 may comprise high-speed switching diodes. In alternative embodiments, one or more of the diodes D1, D2, D3, D4, D5 may be replaced with one or more metal-oxide-semiconductor field-effect transistors (MOSFETs) and/or one or more high order lowpass filters may be used in the demodulator circuit 900.

Figure 10:
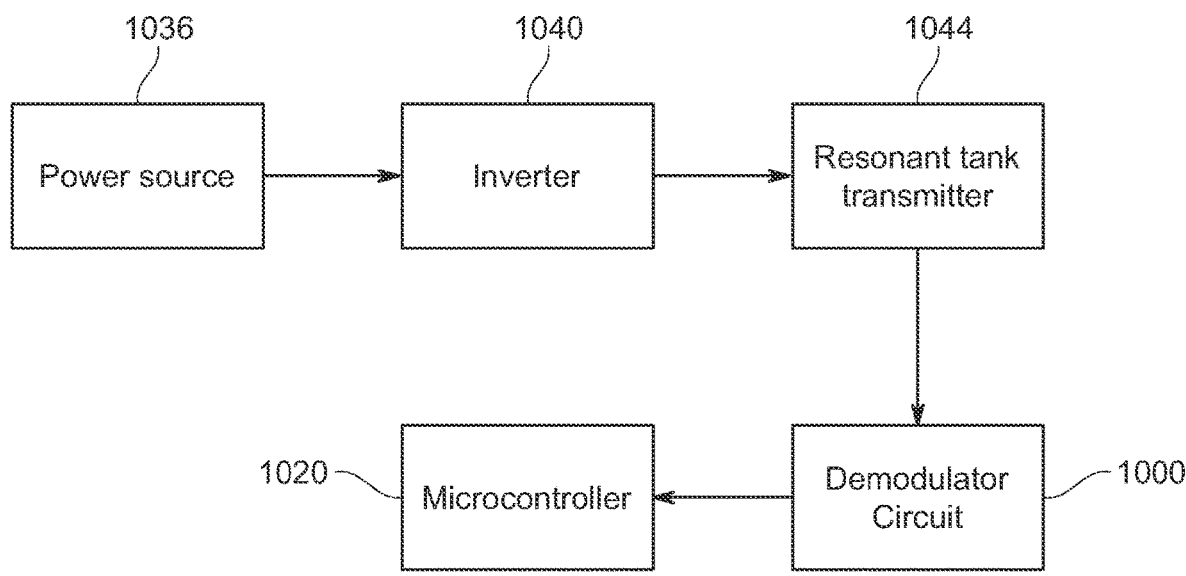
FIG. 10 is a block diagram illustrating an example of a wireless power transfer system at the transmitter side that includes a demodulator circuit for amplitude shift keying (ASK) communication demodulation according to an exemplary embodiment of the present disclosure.

FIG. 10 is a block diagram illustrating an example of a wireless power transfer system at the transmitter side that includes a demodulator circuit 1000 for amplitude shift keying (ASK) communication demodulation according to an exemplary embodiment of the present disclosure. As shown, the wireless power transfer system further includes a power source 1036, an inverter 1040, and a resonant tank transmitter 1044.

The inverter 1040 is coupled with and between the power source 1036 and the resonant tank transmitter 1044. The demodulator circuit 1000 is coupled with the resonant tank transmitter 1044. The demodulator circuit 1000 includes and/or is coupled with the microcontroller 1020, which may be identical or substantially similar to the microcontroller 120 (FIGS. 1-3) or microcontroller 420 (FIG. 4).

The demodulator circuit 1000 may include components (e.g., peak detector, bandpass filter, lowpass filter and control capacitor(s), peak voltage measurement, summing voltage amplifier, lowpass filter, and microcontroller) and one or more levels (Level-1, Level-2 . . . Level-N) identical or substantially similar to the components and level(s) as disclosed herein for demodulator circuits 100 (FIG. 1), 200 (FIG. 2), 300 (FIG. 3), 400 (FIG. 4), 500 (FIG. 5) 600 (FIG. 6), 700 (FIG. 7), 800 (FIG. 8), and/or 900 (FIG. 9). For brevity, the components and one or more levels of the demodulator circuit 1000 will therefore not be described in detail.

Although FIG. 10 illustrates the demodulator circuit 1000 being used in a wireless power transfer system at the transmitter side, the demodulator circuits disclosed herein should not be limited to use with only wireless power transfer system at the transmitter side. The demodulator circuits disclosed herein may be used in various applications, including wireless power transfer devices and applications (e.g., devices that wirelessly transmit power or receive wireless power, etc.), wireless charging devices (e.g., automotive wireless chargers, other wireless power chargers, etc.), transformers, devices to be charged (e.g., smartphones, tablets, other electronic devices, other user equipment (UE) in a vehicle, etc.), etc. Accordingly, the demodulator circuits disclosed herein should not be limited to use with any one particular type of application, end use, demodulator, device to charged, wireless charger, wireless power transfer device, transformer, etc.

Exemplary embodiments disclosed herein may provide a significantly high performance improvement (e.g., up to 3258.97% performance improvement, etc.) compared to state-of-the-art designs. Exemplary embodiments are able to demodulate at poor coupling factor cases with high robustness, which enables further improvements to charging area capabilities. The ASK communication is one of the most important features of a Qi wireless charger and a limiting factor when investigating next generation architectures of wireless charging design. The high-performance solutions disclosed herein open up the gateway to further look into the next generation architectures of wireless power design without worrying about potential ASK communication issues.

FIGS. 11-18 include simulated and measurement performance results and characteristics for a demodulator circuit according to exemplary embodiments of present disclosure. The demodulator circuit is referred to as the "Magnifier" in FIGS. 12-16 and 18. FIGS. 11-18 are provided only for purposes of illustration and not for purposes of limitation as other exemplary embodiments may be configured differently and/or have different performance results and/or characteristics.

Figure 11:
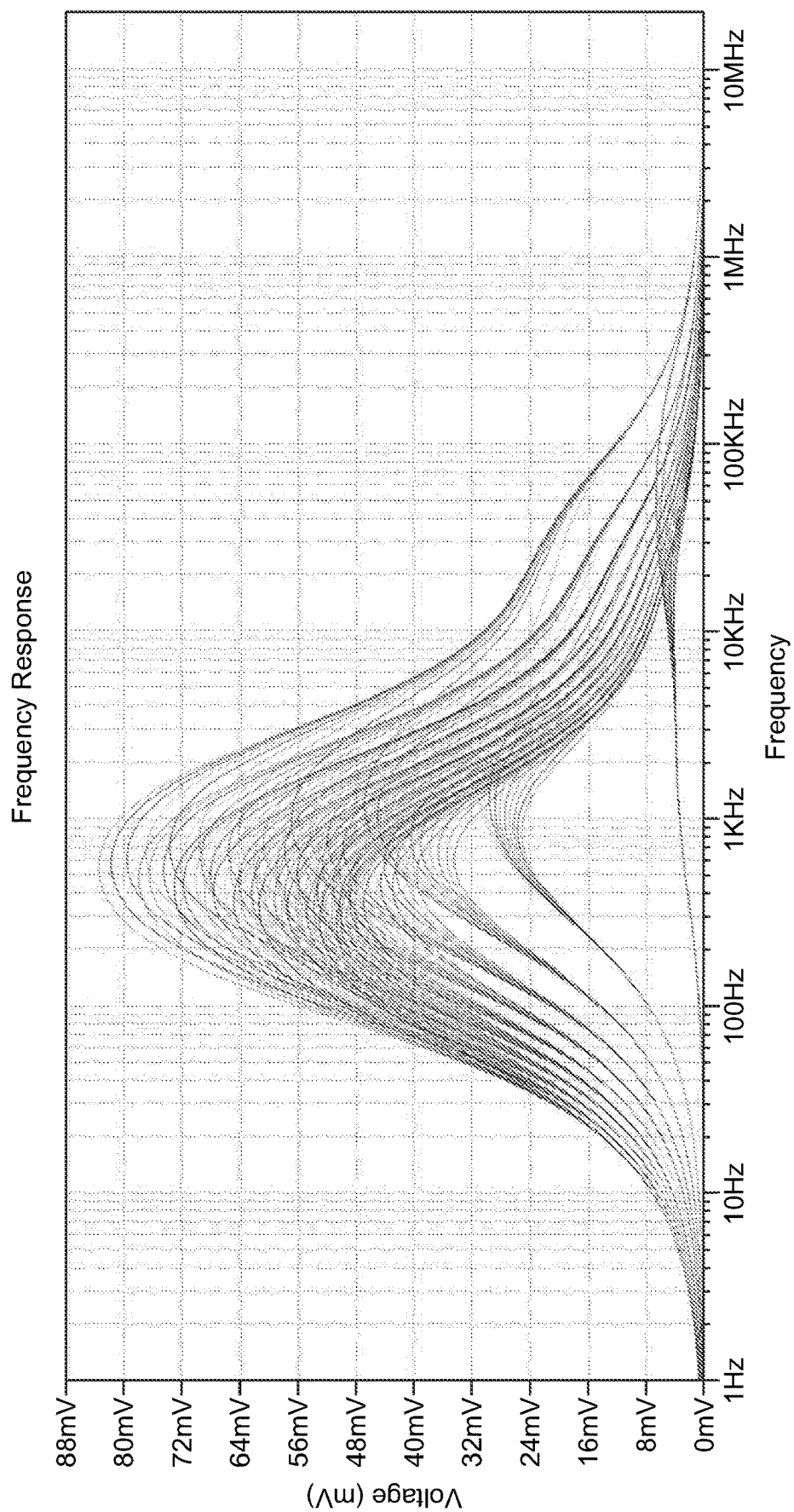
FIG. 11 is a line graph of voltage in millivolts (mV) versus frequency showing frequency responses achievable by selectively configuring the demodulator circuit to include one or more levels of demodulation according to exemplary embodiments of the present disclosure.

FIG. 11 is a line graph of voltage in millivolts (mV) versus frequency showing frequency responses achievable by selectively configuring the demodulator circuit to include one or more levels of demodulation according to exemplary embodiments of the present disclosure. The ability to selectively configure the demodulator circuit to include one or more levels of demodulation provides the user with the option to select different curves in the frequency response to obtain the desired response and with the possibility of selection of multiple frequency bands.

Figure 12:
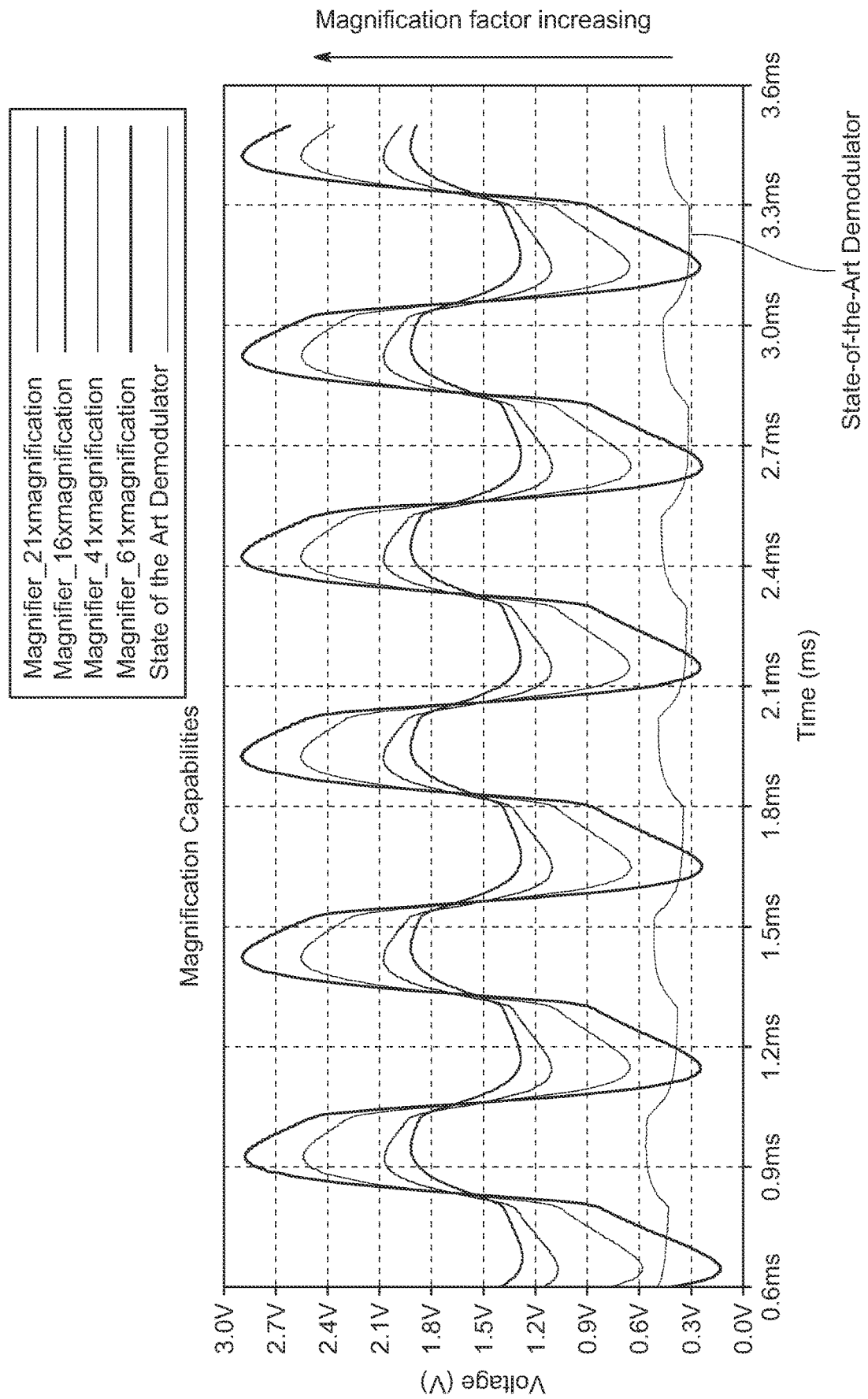
FIG. 12 is a line graph of voltage in volts (V) versus time in milliseconds (mS) for a simulation performed at 50% coupling, which illustrates magnification capabilities (e.g., 16×, 21×, 41×, and 61× magnifications) achievable by selectively configuring the demodulator circuit to include one or more levels of demodulation according to exemplary embodiments of the present disclosure.

FIG. 12 is a line graph of voltage in volts (V) versus time in milliseconds (mS) for a simulation performed at 50% coupling, which illustrates magnification capabilities (e.g., 16×, 21×, 41×, and 61× magnifications) achievable by selectively configuring the demodulator circuit to include one or more levels of demodulation according to exemplary embodiments of the present disclosure. The waveforms for the demodulator circuit with the magnification factor varying shows that one of the capabilities of the demodulator circuit is to increase the depth and having high separation between high and lows. For comparison purposes, magnification is also shown for a state-of-the-art demodulator.

Figure 13:
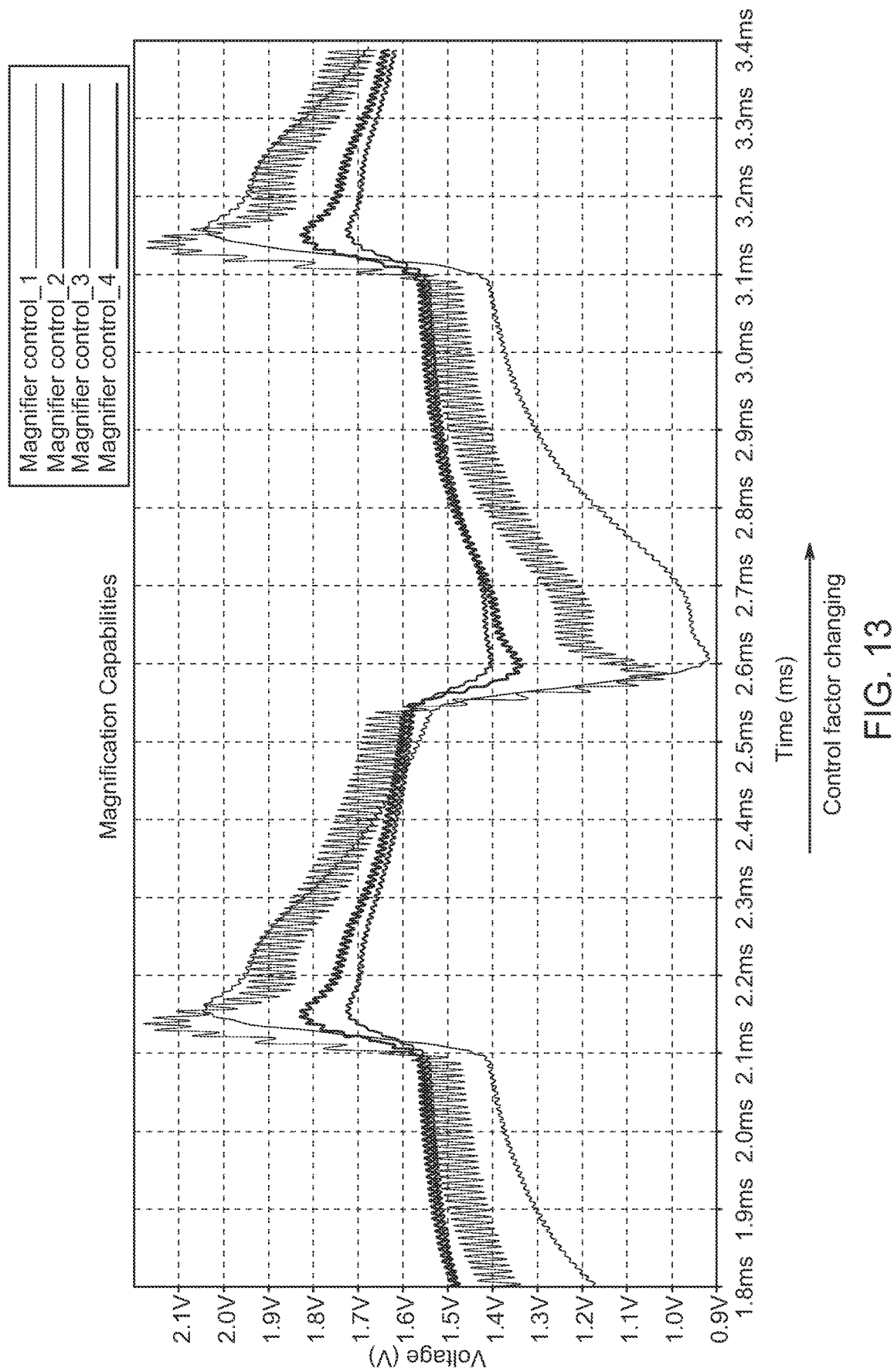
FIG. 13 is a line graph of voltage in volts (V) versus time in milliseconds (mS), which illustrates the high control possible on the waveform that is achievable by selectively configuring the demodulator circuit to include one or more levels of demodulation according to exemplary embodiments of the present disclosure.

FIG. 13 is a line graph of voltage in volts (V) versus time in milliseconds (mS), which illustrates the high control possible on the waveform that is achievable by selectively configuring the demodulator circuit to include one or more levels of demodulation according to exemplary embodiments of the present disclosure.

Figure 14:
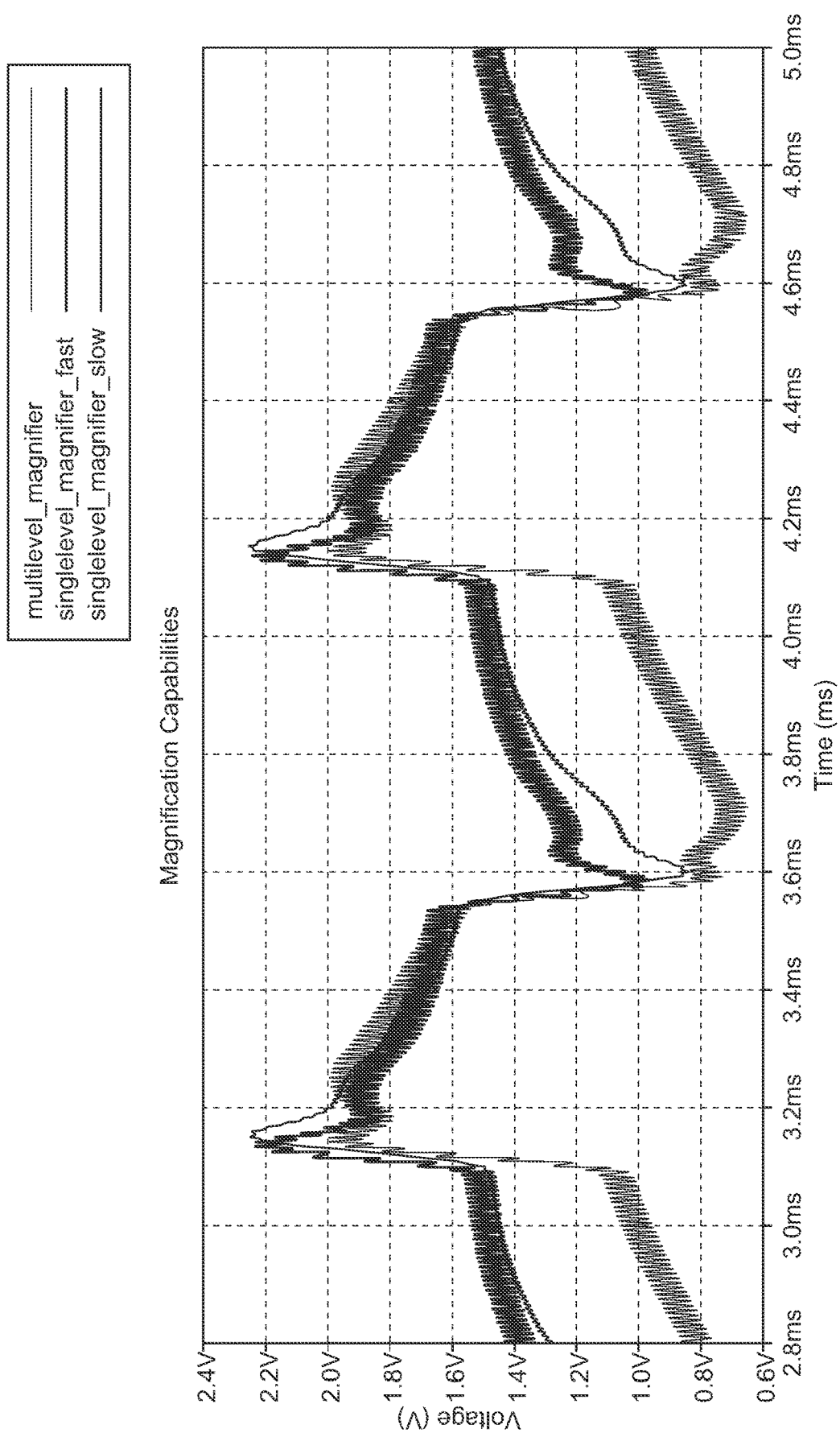
FIG. 14 is a line graph of voltage in volts (V) versus time in milliseconds (mS) for a simulation performed at 10% coupling, which illustrates the high control on slew rate, waveform shape and depth that is achievable by selectively configuring the demodulator circuit to include one or more levels of demodulation according to exemplary embodiments of the present disclosure.

FIG. 14 is a line graph of voltage in volts (V) versus time in milliseconds (mS) for a simulation performed at 10% coupling, which illustrates the high control on slew rate, waveform shape and depth that is achievable by selectively configuring the demodulator circuit to include one or more levels of demodulation according to exemplary embodiments of the present disclosure. FIG. 14 includes simulated results for the multi-level demodulator circuit (multilevel_magnifier) and for a single-level demodulator circuit at a fast rate (singlelevel_mgnifier_fast) and a slow rate (singlelevel_magnifier_fast).

Figure 15:
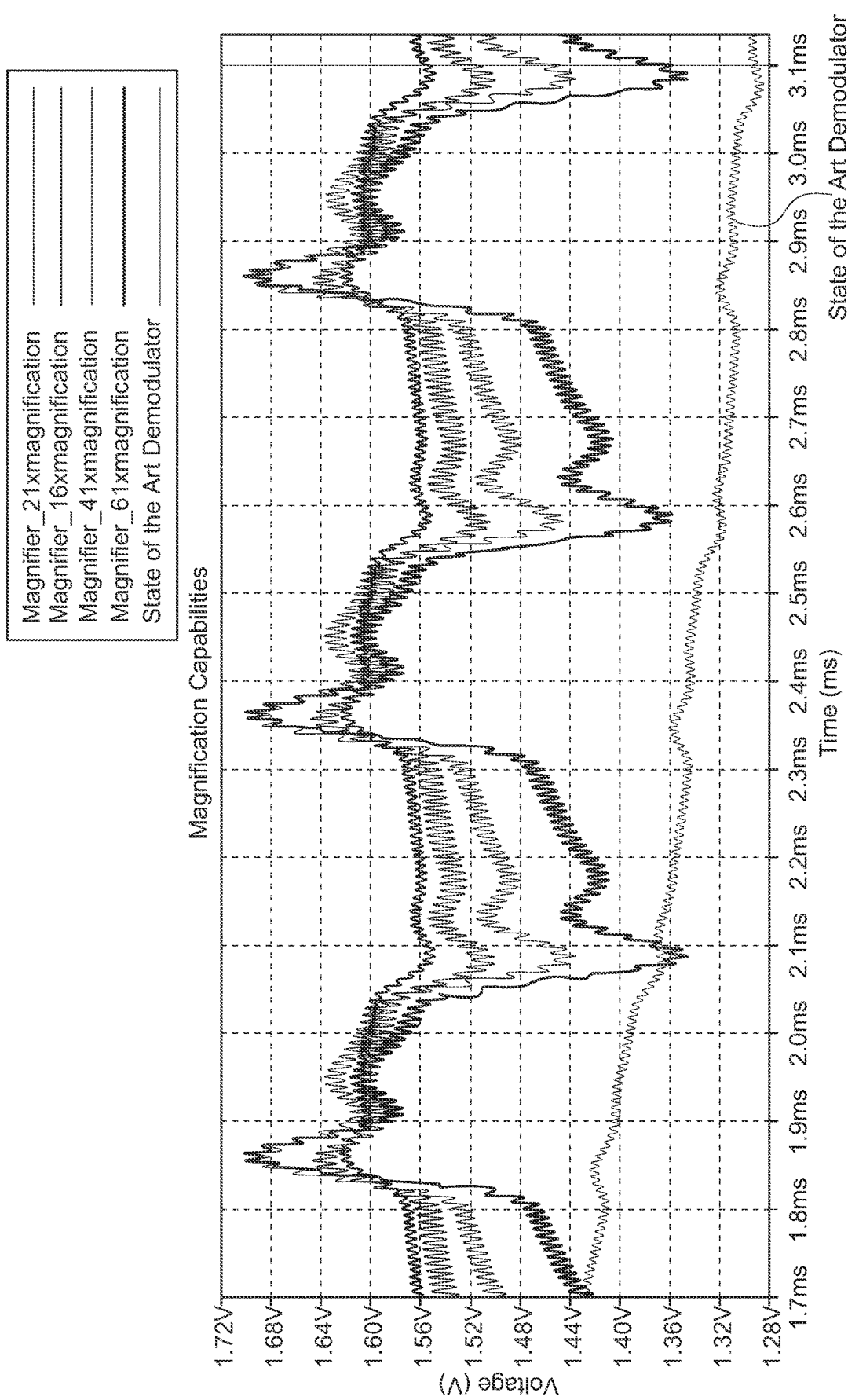
FIG. 15 is a line graph of voltage in volts (V) versus time in milliseconds (mS) for a simulation performed at 5% and 1% coupling, respectively, which illustrates the magnification capabilities (e.g., magnifier at 16×, 21×, 41×, and 61× magnifications) that are achievable even at low or poor coupling factors by selectively configuring the demodulator circuit to include one or more levels of demodulation according to exemplary embodiments of the present disclosure.
Figure 16:
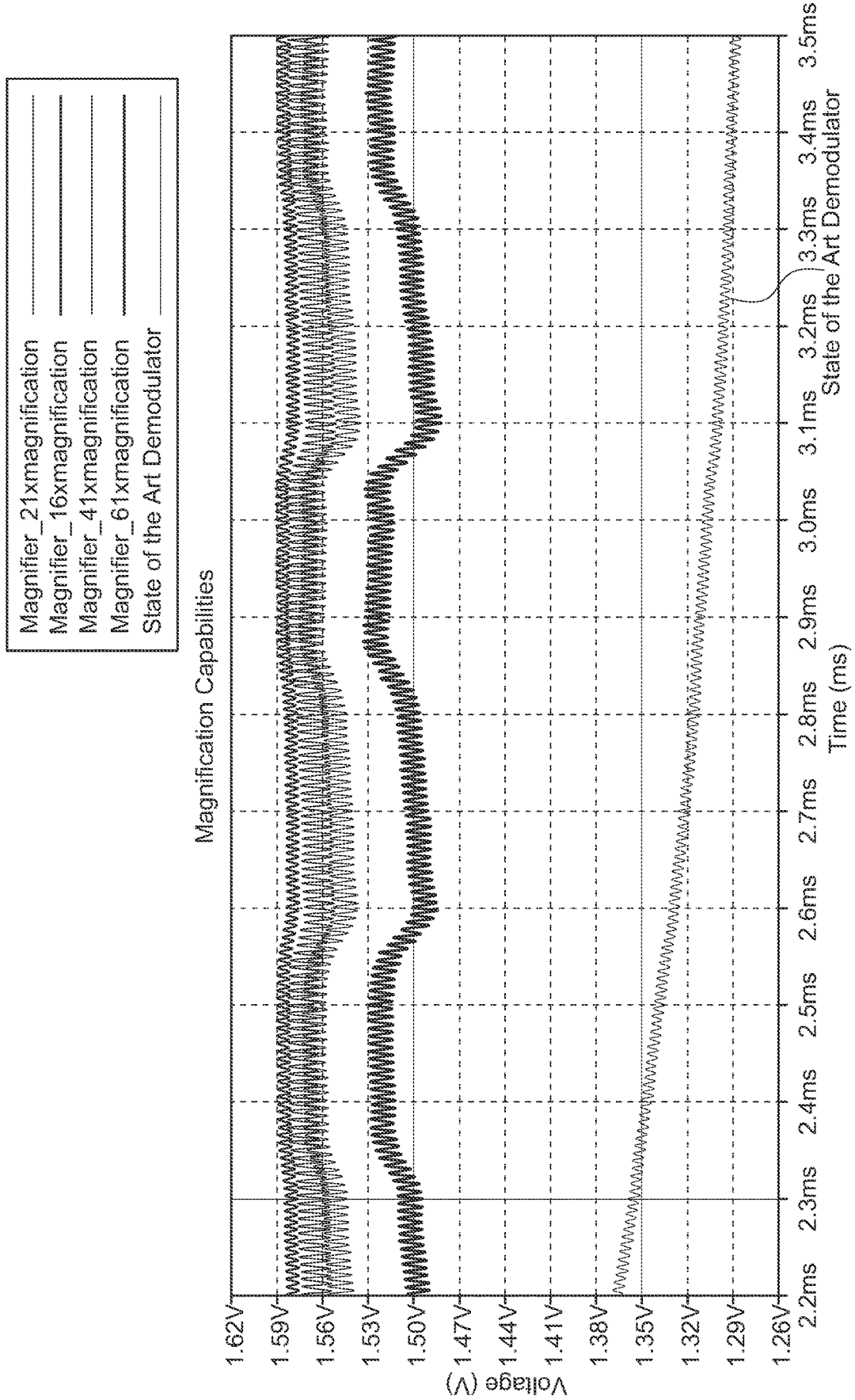
FIG. 16 is another line graph of voltage in volts (V) versus time in milliseconds (mS) for a simulation performed at 5% and 1% coupling, respectively, which illustrates the magnification capabilities (e.g., magnifier at 16×, 21×, 41×, and 61× magnifications) that are achievable even at low or poor coupling factors by selectively configuring the demodulator circuit to include one or more levels of demodulation according to exemplary embodiments of the present disclosure.

FIGS. 15 and 16 are line graphs of voltage in volts (V) versus time in milliseconds (mS) for a simulation performed at 5% and 1% coupling, respectively, which illustrates the magnification capabilities (e.g., magnifier at 16×, 21×, 41×, and 61× magnifications) that are achievable even at low or poor coupling factors by selectively configuring the demodulator circuit to include one or more levels of demodulation according to exemplary embodiments of the present disclosure. For comparison purposes, magnification is also shown for a state-of-the-art demodulator.

Figure 17:
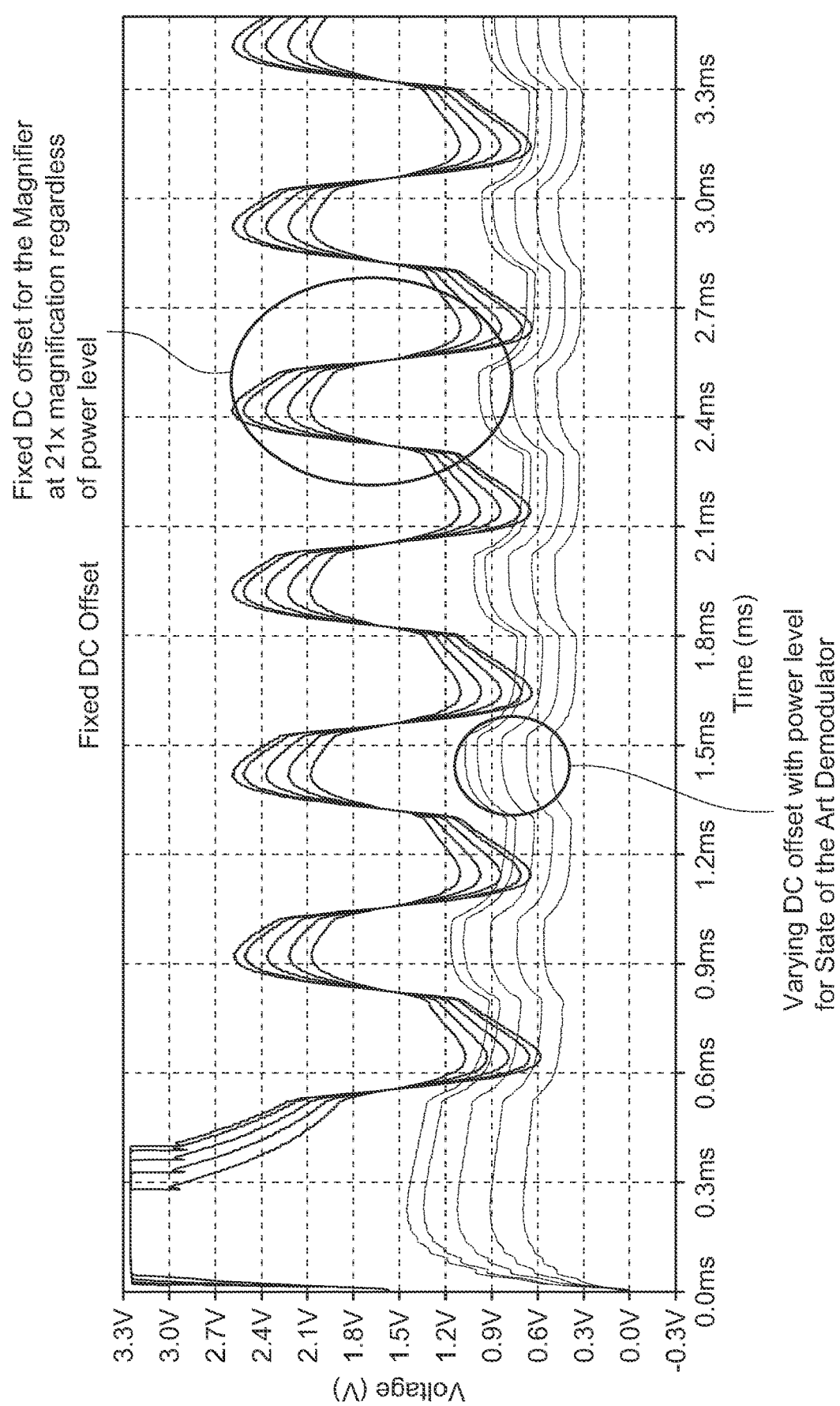
FIG. 17 is a line graph of voltage in volts (V) versus time in milliseconds (mS) showing a fixed DC offset at 21× magnification regardless of power level for the demodulator circuit at 21× magnification according to exemplary embodiments of the present disclosure.

FIG. 17 is a line graph of voltage in volts (V) versus time in milliseconds (mS) showing a fixed DC offset at 21× magnification regardless of power level for the demodulator circuit at 21× magnification according to exemplary embodiments of the present disclosure. For comparison purposes, FIG. 17 also shows a varying DC offset with power level for a state-of-the-art demodulator.

Figure 18:
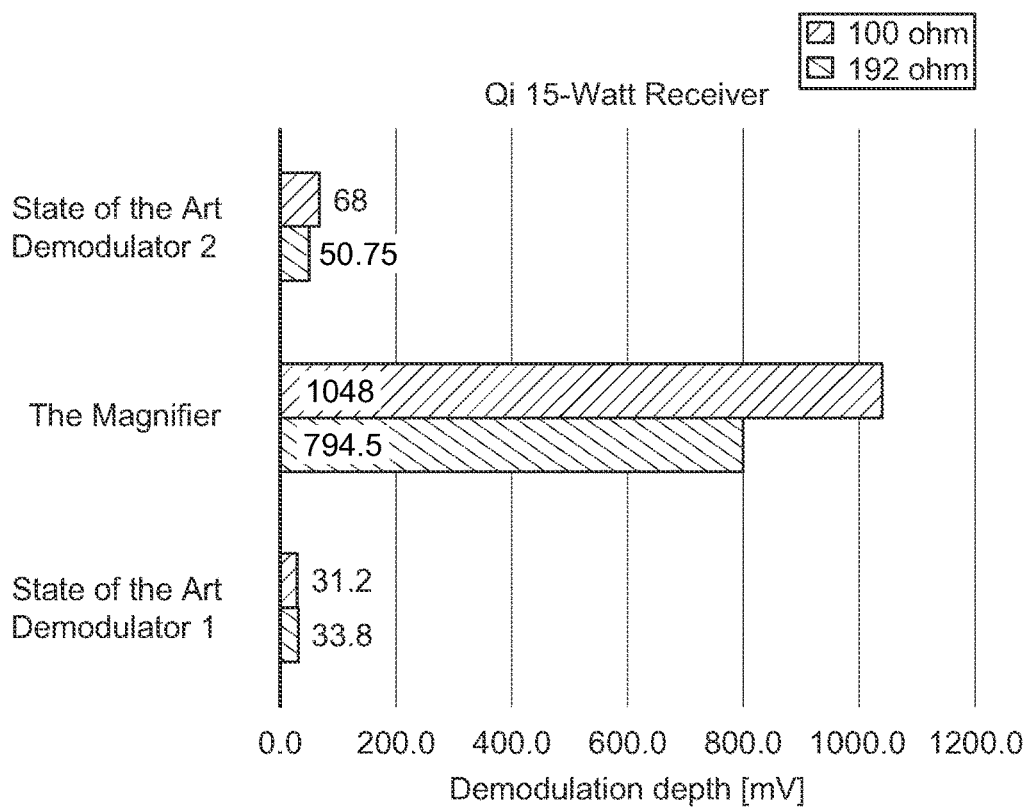
FIG. 18 includes bar graphs of demodulation depth in millivolts (mV) at different loads (5, 16.7, 100, and 192 ohms) for a Qi 15-watt receiver and a Qi 5-watt receiver, which demodulation depths are achievable with a demodulator circuit (identified as The Magnifier in FIG. 18) according to exemplary embodiments of the present disclosure.
Figure 18:
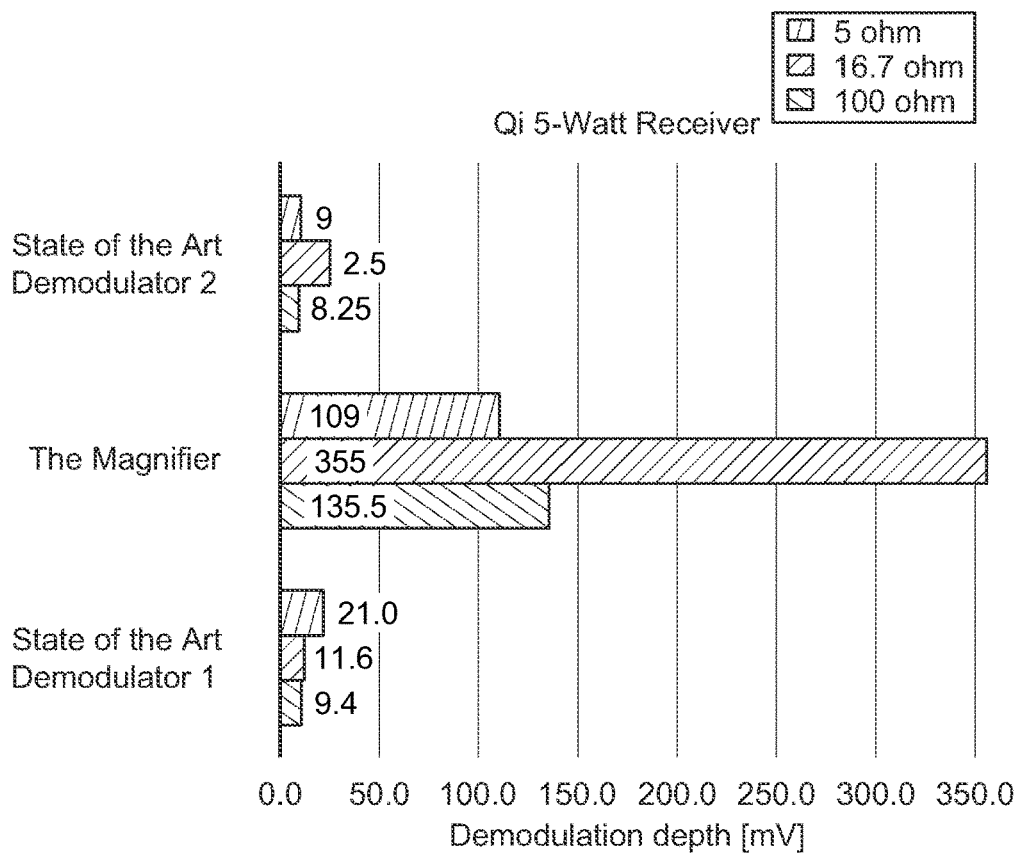

FIG. 18 includes bar graphs of demodulation depth in millivolts (mV) at different loads (5, 16.7, 100, and 192 ohms) for a Qi 15-watt receiver and a Qi 5-watt receiver, which demodulation depths are achievable with a demodulator circuit (identified as The Magnifier in FIG. 18) according to exemplary embodiments of the present disclosure. For comparison purposes, FIG. 18 also shows demodulation depths for a state-of-the-art demodulator 1 (a Rogowski coil) and a state-of-the-art demodulator 2. Accordingly, exemplary embodiments disclosed herein may provide a significantly high performance improvement (e.g., up to 3258.97% performance improvement, etc.) compared to state-of-the-art demodulators.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

I claim:

1. A demodulator circuit for amplitude shift keying (ASK) communication demodulation, the demodulator circuit selectively configurable to include one or more levels of demodulation, each level of demodulation comprising a peak detector, a bandpass filter, and a lowpass filter and control capacitor(s), the bandpass filter coupled with and between the peak detector and the lowpass filter and control capacitor(s), whereby the demodulator circuit is selectively scalable to include any number of additional level(s) of demodulation for selectively changing performance of the demodulator circuit, wherein
each of the one or more levels of demodulation of the demodulator circuit is coupled with a summing voltage amplifier.

2. The demodulator circuit of claim 1, wherein the demodulator circuit is selectively scalable to include any number of additional level(s) of demodulation for selectively increasing magnification by the demodulator circuit.

3. The demodulator circuit of claim 1, wherein the demodulator circuit is selectively scalable to include any number of additional level(s) of demodulation for selectively increasing modulation depth and/or selectively controlling waveform shape.

4. The demodulator circuit of claim 1, wherein:
the demodulator circuit includes a microcontroller, an adaptive DC-offset, and a lowpass filter;
the summing voltage amplifier is coupled with the adaptive DC-offset and the lowpass filter; and
the lowpass filter is coupled with the microcontroller.

5. The demodulator circuit of claim 4, wherein the demodulator circuit includes a peak voltage measurement coupled with the microcontroller and the peak detector of a first level of demodulation of the demodulator circuit.

6. The demodulator circuit of claim 5, wherein:
the peak voltage measurement is configured to be operable for measuring a peak of the voltage;
the microcontroller is configured to be operable for linking analog values received to either the peak or RMS (root mean square) voltage seen at a resonant tank;
the summing voltage amplifier is configured to be operable for introducing a required DC offset via the adaptive DC-offset, for amplifying a signal to a required depth, and for producing a waveform shape as set in a single-level or multilevel architecture based on a control capacitor and filter settings; and
the lowpass filter is configured to be operable for ensuring that only required frequencies of bits are shown to the microcontroller.

7. The demodulator circuit of claim 5, wherein the peak voltage measurement comprises:
a first resistor coupled in series with a first capacitor and a second resistor, such that a node is defined between the first resistor, the second resistor, and the first capacitor; and
the second resistor is coupled in series with a second capacitor and a third resistor, such that a node is defined between the second resistor, the third resistor, and the second capacitor.

8. The demodulator circuit of claim 7, wherein the peak voltage measurement further comprises a fourth resistor in parallel with the first resistor and in series with a switch, to thereby allow for changing peak voltage when a dynamic change in frequency response is selected in any of the one or more levels of demodulation to ensure an appropriate voltage level is supplied to the microcontroller.

9. The demodulator circuit of claim 1, wherein the peak detector of each level of demodulation comprises:
a diode coupled in series with an input;
a first resistor coupled in series with the diode;
a second resistor coupled in series with the first resistor; and
a capacitor coupled in parallel with the second resistor and in series with the first resistor such that a node is defined between the first resistor, the second resistor, and the capacitor.

10. The demodulator circuit of claim 9, wherein the demodulator circuit includes a peak voltage measurement coupled with a microcontroller and the node defined between the defined between the first resistor, the second resistor, and the capacitor of a first level of demodulation of the demodulator circuit.

11. The demodulator circuit of claim 9, wherein each level of demodulation of the demodulator circuit one or more additional resistors and capacitors in parallel with the first resistor and the capacitor of the peak detector and in series with switches, to thereby allow for dynamically changing frequency response of the level of demodulation.

12. The demodulator circuit of claim 1, wherein for each level of demodulation:
the bandpass filter is coupled in series between the peak detector and the lowpass filter and control capacitor(s);
the bandpass filter of each level of demodulation comprises first and second resistors and first and second capacitors;
the lowpass filter and control capacitor(s) comprises a third resistor; and
the first capacitor is coupled in series with an input via a path through the peak detector;
the first capacitor is coupled in series with the first resistor and the second resistor such that a node is defined between the first capacitor, the first resistor, and the second resistor; and the second resistor is coupled in series with the second capacitor and the third resistor such that a node is defined between the second capacitor, the second resistor, and the third resistor.

13. The demodulator circuit of claim 12, wherein:
the demodulator circuit includes the summing voltage amplifier;
for a first level of demodulation, the lowpass filter and control capacitor(s) further comprises a third capacitor coupled in series with the third resistor and the summing voltage amplifier, such that a node is defined between the third resistor, the third capacitor, and the summing voltage amplifier; and
for each additional level of demodulation, the third resistor of the lowpass filter and control capacitor(s) is coupled with the node of the first level of demodulation that is defined between the third resistor, the first capacitor, and the summing voltage amplifier.

14. The demodulator circuit of claim 1, wherein each level of demodulation of the demodulator circuit includes a switch coupled in series with an input and a diode of the peak detector, to thereby allow for individually selecting a particular level of demodulation of the demodulator circuit.

15. The demodulator circuit of claim 1, wherein each level of demodulation of the demodulator circuit includes one or more switchable resistors and capacitors to thereby allow for dynamically changing frequency response of the level of demodulation.

16. The demodulator circuit of claim 1, wherein each level of demodulation of the demodulator circuit includes one or more switchable resistors to thereby allow for dynamically changing amplification or magnification factor and DC adaptive offset.

17. The demodulator circuit of claim 1, wherein for at least a first level of demodulation, the demodulator circuit includes one or more switchable capacitors to thereby allow for controlling speed of the demodulation signal waveform/control factor by dynamically changing the one or more switchable capacitors.

18. The demodulator circuit of claim 1, wherein the demodulator circuit comprises at least two levels of demodulation each including the peak detector, the bandpass filter, and the lowpass filter and control capacitor(s).

19. A wireless power transfer device comprising the demodulator circuit of claim 1, an inverter, and a resonant tank transmitter, wherein:
the inverter is configured to be coupled with and between a power source and the resonant tank transmitter; and
the demodulator circuit is coupled with the resonant tank transmitter; and the demodulator circuit includes or is coupled with a microcontroller.

20. A method of providing amplitude key shifting (ASK) communication demodulation, the method comprising:
selectively configuring a demodulator circuit to include any number of levels of demodulation for selectively changing performance of the demodulator circuit, each level of modulating each level of demodulation comprising a peak detector, a bandpass filter, and a lowpass filter and control capacitor(s), the bandpass filter coupled with and between the peak detector and the lowpass filter and control capacitor(s); and
coupling each of the one or more levels of demodulation of the demodulator circuit with a summing voltage amplifier.

21. The method of claim 20, wherein the method includes selectively increasing magnification by the demodulator circuit by selectively configuring the demodulator circuit to one or more additional level(s) of demodulation.

22. The method of claim 20, wherein the method includes selectively increasing modulation depth and/or selectively controlling waveform shape by selectively configuring the demodulator circuit to one or more additional level(s) of demodulation.

* * * * *